(12) United States Patent
Gomyo

(10) Patent No.: US 7,220,054 B2
(45) Date of Patent: May 22, 2007

(54) DYNAMIC PRESSURE BEARING APPARATUS

(75) Inventor: Masato Gomyo, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 11/484,911

(22) Filed: Jul. 12, 2006

(65) Prior Publication Data

US 2006/0251351 A1 Nov. 9, 2006

Related U.S. Application Data

(62) Division of application No. 10/473,543, filed as application No. PCT/JP02/03696 on Apr. 12, 2002, now Pat. No. 7,101,084.

(30) Foreign Application Priority Data

Apr. 13, 2001 (JP) ............................. 2001-115324
Apr. 13, 2001 (JP) ............................. 2001-115618

(51) Int. Cl.
*F16C 32/06* (2006.01)

(52) U.S. Cl. ...................................... 384/107; 384/112
(58) Field of Classification Search ................ 384/107, 384/112, 110, 123, 121
See application file for complete search history.

(56) References Cited

U.S. PATENT DOCUMENTS 5,743,656 A * 4/1998 Gomyo et al. .............. 384/124

* cited by examiner

*Primary Examiner*—Lenard A. Footland
(74) *Attorney, Agent, or Firm*—Notaro & Michalos P.C.

(57) ABSTRACT

A dynamic bearing apparatus which supports a shaft and a bearing so as to be capable of relative rotation by a dynamic pressure of a lubricating fluid. A bottomed screw hole (21a) is provided to at least one end of the shaft (21) to screw a headed screw (24) for attaching a thrust plate (23) a lubricating fluid (F) is filled in a gap of a screw portion between the screw (24) and the screw hole (21a) or a screw non-occupied space (17), and an interposing member (25) which reduces a void cubic content in the screw non-occupied space (17) is attached to the screw non-occupied space (17).

1 Claim, 18 Drawing Sheets

DYNAMIC PRESSURE BEARING APPARATUS

CROSS-REFERENCE TO RELATED APPLICATIONS

This is a divisional of U.S. patent application Ser. No. 10/473,543 filed Sep. 30, 2003 and now U.S. Pat. No. 7,101,084, which claims priority benefits of International Patent Application PCT/JP02/03696 filed Apr. 12, 2002, both of which are incorporated here by reference, and which further claims priority rights from Japanese Patent Applications 2001-115618 and 2001-115324 both filed on Apr. 13, 2001, which priority claims are repeated here.

TECHNICAL FIELD

The present invention relates to a bearing apparatus. More particularly, the present invention relates to a dynamic pressure bearing apparatus which supports a shaft and a bearing by a dynamic pressure of a lubricating fluid so as to be capable of relatively rotating.

BACKGROUND ART

In recent years, there have been made various kinds of proposals concerning a dynamic pressure bearing apparatus used to support various kinds of rotors in a device having a portion which rotates at a high speed, which is typified by a magnetic disc, a polygon mirror or an optical disc. For example, in a dynamic pressure bearing apparatus adopted in a hard disk drive apparatus (which will be referred to as an HDD hereinafter) shown in FIG. 21, a rotary shaft (shaft) 2 is rotatably inserted in a fixed bearing sleeve (bearing) 1, and a lubricating fluid F such as an oil or a magnetic fluid is injected into a minute gap between an inner peripheral surface of the bearing sleeve 1 and an outer peripheral surface of the rotary shaft 2, thereby constituting two radial bearing portions RB and RB provided at respective positions so as to be separated from each other in the axial direction. It is to be noted that, in this HDD, a rotary hub 5 used to hold a recording disk (not shown) is joined to a part of the rotary shaft 2 which is protruding from the bearing sleeve 1 by press fitting or shrink fitting, and the recording disk is held by a clamper (not shown) screwed by utilizing a screw hole 7 at an upper end portion of the rotary hub 5.

In such a dynamic pressure bearing apparatus, a thrust plate 3 is provided at least one end of the rotary shaft 2 as well as the above-described radial bearing portions RB and RB, and thrust bearing portions SBa and SBb are constituted between the bearing sleeve 1 and a counter plate 4 attached to the bearing sleeve 1. The lubricating fluid F is continuously injected into the thrust bearing portions SBa and SBb from the radial bearing portions RB.

Here, as to attachment of the thrust plate 3 to the rotary shaft 2, the structure that joining is performed by a fastening force of such a headed screw 6 as shown in FIG. 21 is conventionally known from, e.g., Japanese Registered Utility Model Publication No. 256791, Japanese patent Application Laid-open Publication No. 74841/1996 and others. Such a screwing structure holds the thrust plate 3 so as to be sandwiched in the axial direction between a head portion 6a of a headed screw 6 screwed at a lower end portion of the rotary shaft 2 and an end surface of the rotary shaft 2.

The screwing structure of this thrust plate 3 corresponds to a request or the like for a reduction in thickness of the dynamic pressure bearing apparatus. That is, when a height of the dynamic pressure bearing apparatus in the axial direction is greatly suppressed owing to a reduction in thickness of the dynamic pressure bearing apparatus, a joint length of the thrust plate 3 relative to the rotary shaft 2 in the axial direction is reduced, and the joint strength of the thrust plate 3 may be possibly lowered. In particular, in an apparatus such as a mobile computer which is presupposed to be carried, the impact resistance at the time of falling or the like must be sufficiently assured, and hence the joint strength of the thrust plate 3 is a serious problem. Thus, adoption of the above-described screwing structure is used to firmly fix the thrust plate 3.

Further, as another attachment method of the thrust plate 3 relative to the rotary shaft 2, there is a fixing technique such as press fitting or shrink fitting as shown in FIG. 22, for example. In this case, the thrust bearing portions SBa and SBb are configured above and below the thrust plate 3' between the thrust plate 3' fixed at the lower end portion of the rotary shaft 2' by press fitting or shrink fitting and the bearing sleeve 1 and between the thrust plate 3' and the counter plate 4' attached to the bearing sleeve 1. It is to be noted that a rotary hub 5' used to hold the recording disk is joined to a part of the rotary shaft 2' which is protruding from the bearing sleeve 1 by press fitting, shrink fitting or the like, and a damper 9 is fixed at the upper end portion of the rotary shaft 2' by the headed screw 6' so that the recording disk 8 is held by a pressing force of the damper 9 in the axial direction. It is to be noted that the reference numeral 6a' denotes a screw head portion, 6b' designates a male screw portion and 2a' denotes a female screw portion formed from the upper end surface of the rotary shaft 2' toward the lower end surface of the same in the drawing.

In the fixing structure of the thrust plate 3 using screwing shown in FIG. 21, however, the lubricating fluid F gradually penetrates by the capillarity generated in a gap, to the gap of the screw portion where the female screw portion formed to the shaft 2 and the male screw portion on the headed screw 6 side are screwed. As a result, the lubricating fluid F in the thrust dynamic pressure bearing portion is substantially decreased and becomes insufficient, thereby possibly reducing the duration of life of the bearing.

Furthermore, since a hole which is preparedly provided for thread cutting is opened longer than the female screw portion, a space (which is called a screw non-occupied space) is generated between the end of the headed screw 6 and the bottom of the screw hole. Since air remains in the screw non-occupied space, when the remaining air is expanded by an increase in temperature, the expanded air pushes the lubricating fluid F toward the outside, which results in the leak. Such leak of the lubricating fluid F may possibly lead to a fatal problem in the HDD or the like requiring the cleanness.

In the dynamic pressure bearing apparatus shown in FIG. 22, the female screw portion 2a' used to fix the damper 9 formed to the rotary shaft 2' is configured so as to be cut by a bottomed hole. Therefore, foreign matters such as chips generated at the time of thread cutting or the like are readily deposited on the bottom of the hole in which the female screw portion 2a' is cut. Moreover, the foreign matters once deposited on the bottom of the hole of the female screw portion 2a' cannot be completely removed even if a cleansing step or the like is carried out. If these foreign matters spatter to the outside during use of the apparatus, they adhere to the recording disk which must be cleaned, which may possibly result in a fatal error problem such that recording/reproduction of information is disabled, for example.

Additionally, if a reduction in thickness of the apparatus further advances, a length of the lower hole of the female screw portion $2a'$ formed to the above-described rotary shaft $2'$ is also decreased. In such a case, the female screw portion $2a'$ is subjected to thread cutting in the shortened lower hole by using the similarly shortened threading tap tool. However, by doing so, a large stress is loaded to the tap tool when shaping the screw, a problem such that the tap tool is readily bent occurs, thereby possibly lowering the productivity.

It is an object of the present invention to provide a dynamic pressure bearing apparatus which can readily increase the joint strength of the thrust plate relative to the shaft and simultaneously obtain the excellent dynamic pressure characteristic and high productivity. It is another object of the present invention to provide a dynamic pressure bearing apparatus excellent in the cleanliness and the processability.

DISCLOSURE OF INVENTION

To achieve this aim, according to the present invention, there is provided a dynamic pressure bearing apparatus in which a radial dynamic pressure bearing portion is constituted between an inner peripheral surface of a bearing and an outer peripheral surface of a shaft, a thrust dynamic pressure bearing portion is constituted between a thrust plate attached to at least one end surface side of the shaft and the bearing or a counter plate fixed to the bearing and the bearing and the shaft are supported by generating a dynamic pressure to a lubricating fluid injected into each dynamic pressure bearing portion by relative rotation produced between the bearing and the shaft, wherein a bottomed screw hole used to screw a headed screw which attaches the thrust plate is provided to at least one end of the shaft, the lubricating fluid is filled in a gap of a screw portion between a screw and a screw hole or a screw non-occupied space between a bottom portion of the screw hole and a screw portion end of the headed screw, and an interposing member which reduces a void cubic content in the screw non-occupied space is attached to the screw non-occupied space.

According to the present invention, therefore, since air does not remain in the screw hole when the lubricating fluid is filled in the screw gap in the screw hole or the screw non-occupied space, risk of leak of the lubricating fluid to the outside of the bearing by expansion of the remaining air can be excellently avoided. Further, the leakage phenomenon of the lubricating fluid having the larger thermal expansion property than the metal member constituting each member on the bearing side can be further reduced by decreasing a quantity of the lubricating fluid to be filled in the screw non-occupied space by an amount corresponding to a cubic content of the interposing member, thereby improving the above-described advantage. Furthermore, although this structure is simple but it can readily increase the joint strength of the thrust plate relative to the shaft and obtain the excellent dynamic pressure characteristic and the high productivity at the same time.

Moreover, in the dynamic pressure bearing apparatus according to the present invention, it is preferable that the interposing member is formed as a member provided separately from the headed screw or formed of a resin material which is injected into the screw non-occupied space and hardened there. It this case, since a general headed screw can be used as the headed screw, thereby decreasing the component cost.

Additionally, in the dynamic pressure bearing apparatus according to the present invention, it is preferable that the interposing member is formed as a member integral with the headed screw. In this case, since attachment of the interposing member is completed simultaneously with screwing of the headed screw, i.e., fixation of the thrust plate to the shaft, the assembling step becomes efficient, thereby improving the productivity.

Further, in the dynamic bearing apparatus according to the present invention, a fluid injection path which causes the gap of the screw portion in the screw hole and the screw non-occupied space to communicate with the outside of the shaft is provided at a contact portion between the thrust plate and the screw head portion of the headed screw or the thrust plate and the end surface of the shaft. In this case, the lubricating fluid can be injected into the gap of the screw portion in the screw hole and the screw non-occupied space through the injection path in a short time, thereby improving the productivity.

Furthermore, it is preferable that the fluid injection path includes a thrust fluid path which causes thrust dynamic pressure bearing portions respectively formed on both sides of the thrust plate in the axial direction to communicate with each other. In this case, even if a pressure difference is generated between the thrust dynamic pressure bearing portions with the thrust plate therebetween during rotation, the lubricating fluid can be appropriately reciprocated through the thrust fluid path, thereby obtaining the stable dynamic pressure characteristic.

Moreover, in the dynamic pressure bearing apparatus according to the present invention, a tool engagement concave portion for fastening provided at the screw head portion of the headed screw is filled with an adhesive having the oil resistance. In this case, since chip pieces such as a flash generated during the fastening operation of the headed screw can be assuredly prevented from scattering to the outside and the excellent cleanliness can be obtained, thereby further improving the dynamic pressure characteristic.

Further, in the dynamic pressure bearing apparatus according to the present invention, a through hole piercing in the axial direction is provided to the shaft, a female screw portion is formed, and the thrust plate is fixed to at least one end of the shaft by the headed screw which engages with the female screw portion. An adhesive, which seals a gap in the engagement portion and prevents the lubricating fluid from leaking outside, is filled in at least a part of the screwing portion of the headed screw and the female screw portion of the shaft.

Therefore, since the screw portion with the necessary length can be readily obtained even if the axial length is shortened (the height direction of the dynamic pressure bearing apparatus is reduced), the fastening force of the headed screw which fixes the thrust plate can be assured, thereby obtaining the sufficient joint strength of the thrust plate. Further, the female screw portion can be readily and efficiently processed with respect to the lower hole consisting of the through hole having a maximum length by using a thread cutting tool having an enough processing length. Furthermore, foreign matters such as chips which have entered in the shaft when processing the female screw portion can be easily removed to the outside via the through hole, thus obtaining the excellent cleanliness. Moreover, since there is provided a simple structure which can readily perform injection of the adhesive into the screw end by utilizing the through hole and the looseness of the headed screw which fixes the thrust plate can be avoided while preventing the lubricating fluid which tends to flow out to the outside via the through hole, the reliability of the strength, the cleanliness and the workability of the dynamic pressure bearing apparatus can be improved with the simple structure.

Additionally, in the dynamic pressure bearing apparatus according to the present invention, a ventilation path which causes a gap which reaches an adhesive filled part of the screw portion in the screw hole to communicate with the outside of the shaft is provided at a contact portion between the thrust plate and the screw portion of the headed screw or the thrust plate and the end surface of the shaft. In this case, when injecting the adhesive into the screw end portion from the open portion of the through hole, since air in the through hole and in the gap of the screw portion can be removed to the outside via the ventilation path, the adhesive injection operation can be very excellently and rapidly carried out.

Further, in the dynamic bearing apparatus according to the present invention, a tool engagement concave portion for fastening which is provided to the screw head portion of the headed screw which is screwed into the female screw portion of the through hole is filled with an adhesive with the oil resistance. In this case, since chip pieces such as the flash generated in the fastening operation of the headed screw can be assuredly prevented from scattering to the outside and the excellent cleanliness can be obtained, thus further improving the dynamic pressure characteristic.

BEST MODE FOR CARRYING OUT OF THE INVENTION

A structure of the present invention will now be described in detail based on the illustrated best mode.

Figure 1:
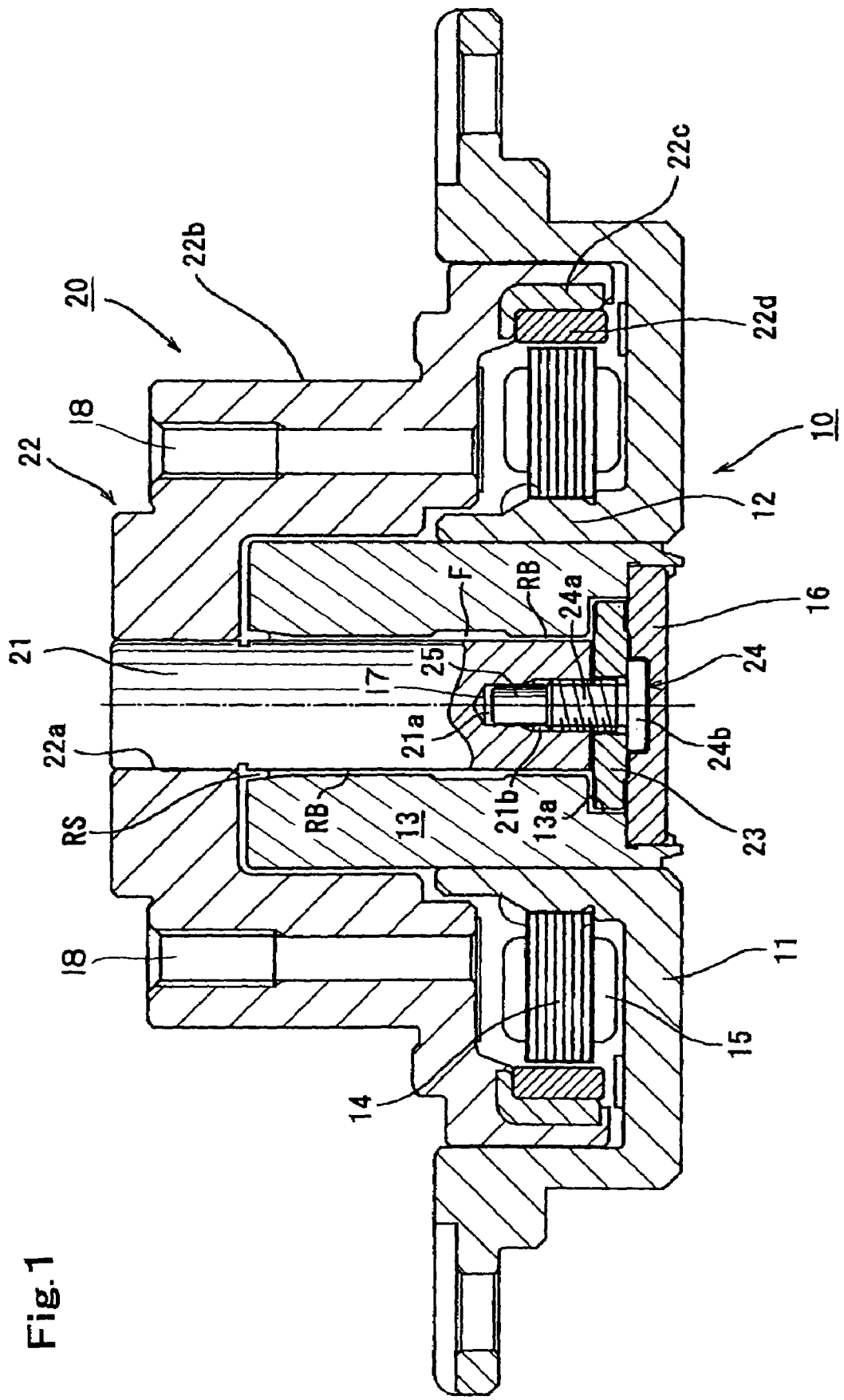
FIG. 1 is a vertical cross-sectional view showing an entire structure of an HDD including an axial rotation type dynamic pressure bearing apparatus according to an embodiment of a dynamic pressure bearing apparatus of the present invention.

FIG. 1 shows an HDD using an embodiment of a dynamic pressure bearing apparatus according to the present invention. This HDD is of an axial rotation type and constituted by a stator set 10 as a fixing member and a rotor set 20 as a rotation member assembled to the stator set 10 from the upper side. The stator set 10 has a fixed frame 11 screwed to a non-illustrated fixed base side. Although this fixed frame 11 is formed of, e.g., an aluminium alloy in order to reduce the weight thereof, a bearing sleeve 13 as a bearing formed into a hollow cylindrical shape is joined to a bearing holder 12 by press fitting or shrink fitting on the inner peripheral surface side of the cylindrical bearing holder 12 formed so as to be erected at a substantially central portion of the fixed frame 11. This bearing sleeve 13 is formed of a copper alloy such as phosphorous bronze in order to facilitate boring of a small diameter or the like.

Further, a stator core 14 consisting of a laminated body of an electromagnetic steel plate is fitted to the outer peripheral attachment surface of the bearing holder 12. A drive coil 15 is wound around each salient pole provided to the stator core 14.

Furthermore, a shaft (which will be referred to as a rotary shaft hereinafter) constituting the rotor set 20 is rotatably inserted into the bearing sleeve 13. That is, a dynamic pressure surface formed at the inner peripheral wall portion of the bearing sleeve 13 is arranged so as to be opposed to the dynamic pressure surface formed on the outer peripheral surface of the rotary shaft 21 in the radial direction, and a radial dynamic pressure bearing portion RB is constituted at a small gap portion. In detail, the dynamic pressure surface on the bearing sleeve 13 side in the radial dynamic pressure bearing portion RB and the dynamic pressure surface on the rotary shaft 21 side are arranged so as to be opposed to each other in the circumferential form with a small gap of several µm therebetween, a lubricating fluid F such as a lubricating oil or a magnetic fluid (air in some cases) is continuously injected or interposed in the bearing space consisting of the small gap in the axial direction.

Furthermore, non-illustrated radial dynamic pressure generating grooves consisting of a herringbone shape or the like are divided into two blocks in the axial direction and annularly provided at least one side of the dynamic pressure surfaces of the bearing sleeve 13 and the rotary shaft 21. Moreover, during rotation, a pressure is applied to the lubricating fluid F by a pumping effect of the radial dynamic pressure generation grooves, a dynamic pressure is generated between the bearing sleeve 13 and the rotary shaft 21, and a rotary hub 22 is supported together with the rotary shaft 21 with respect to the bearing sleeve 13 in the radial direction in the non-contact state.

Additionally, a capillary seal portion RS is arranged at an open part at the upper end of the bearing space constituting each radial dynamic pressure bearing portion RB. This capillary seal portion RS is obtained by gradually enlarging a gap between the rotary shaft 21 and the bearing sleeve 13 toward the outside of the bearing by forming an inclined surface to at least one of the rotary shaft 21 and the bearing sleeve 13, and it is set in such a manner that the gap is gradually enlarged from, e.g., 20 µm to 300 µm. A liquid level of the lubricating fluid F is positioned to the capillary seal portion RS in both rotation and stop of the motor.

Moreover, the rotary hub 22 constituting the rotor set 20 together with the rotary shaft 21 consists of a substantially cup-shaped member consisting of an aluminium-based metal, and a junction hole 22a provided at the central part of the rotary hub 22 is integrally coupled with a part of the rotary shaft 21 protruding from the bearing sleeve 13 by press fitting or shrink fitting. Additionally, a recording medium such as a magnetic disk is fixed to the rotary hub 22 by a non-illustrated camper.

The rotary hub 22 has a substantially cylindrical trunk portion 22b used to mount a recording medium disk on the outer peripheral part, and an annular drive magnet 22d is attached on the inner peripheral wall surface side on the lower side of the trunk portion 22b through a back yoke 22c. The annular drive magnet 22d is arranged in close proximity so as to be annularly opposed to the outer peripheral side end surface of the stator core 14.

Figure 2:
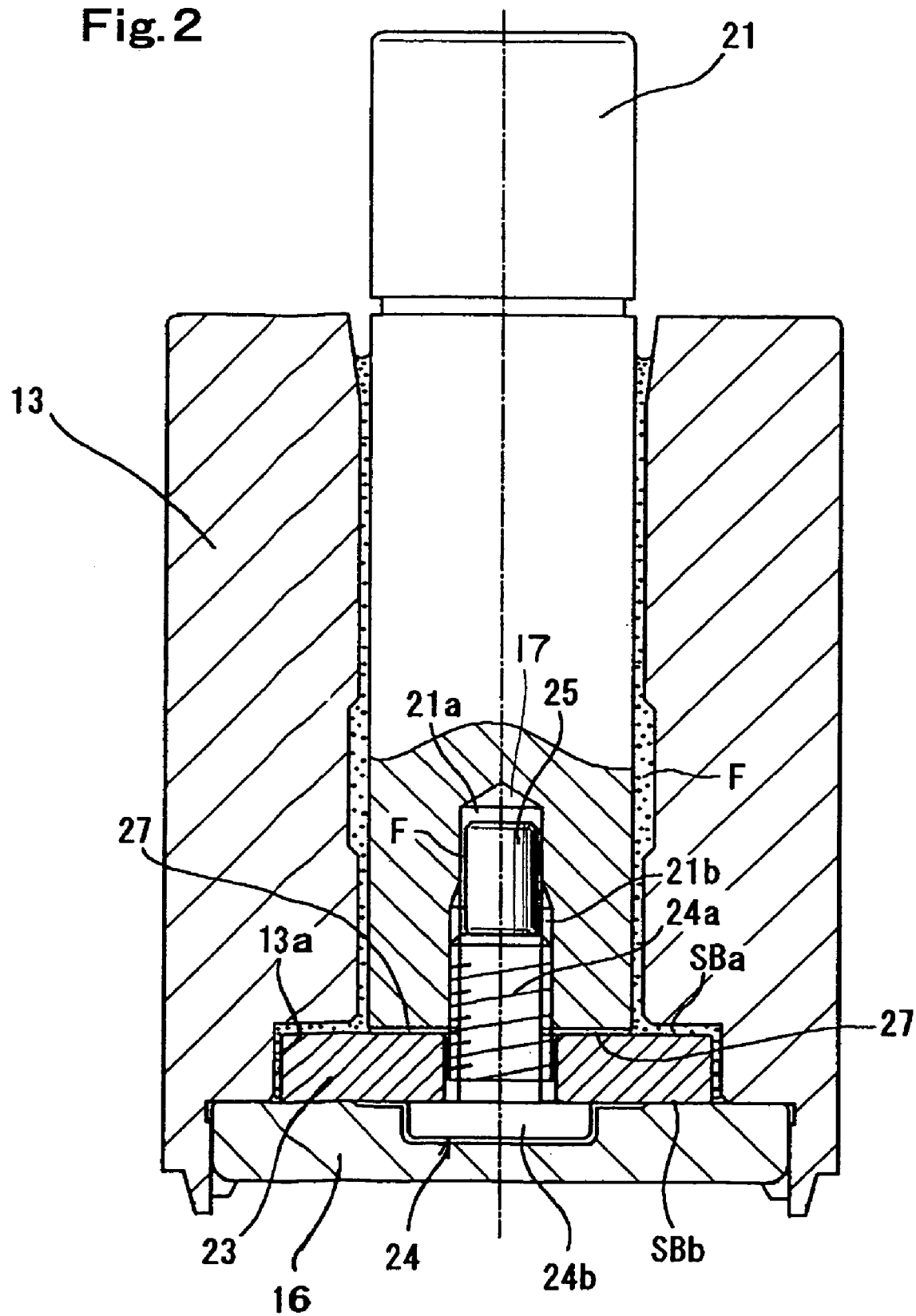
FIG. 2 is an enlarged vertical cross-sectional view showing a dynamic pressure bearing apparatus portion of the HDD depicted in FIG. 1.

As shown in FIG. 2 in the enlarged manner, a discoid thrust plate 23 is fixed to the lower end portion of the rotary shaft 21 by a plate fixing screw 24. This thrust plate 23 is arranged in such a manner that it is accommodated in a circular concave portion 13a provided so as to be dimpled at the inner side part at the lower end of the bearing sleeve 13. In the concave portion 13a of the bearing sleeve 13, a dynamic pressure surface provided on the upper surface of the thrust plate 23 is oppositely arranged so as to come close to the dynamic pressure surface provided to the bearing sleeve 13 in the axial direction. Additionally, non-illustrated thrust dynamic pressure generating grooves consisting of a herringbone shape or the like are formed on the upper dynamic pressure surface of the thrust plate 23, and an upper thrust dynamic pressure bearing portion SBa is formed at the gap portion between the opposed dynamic pressure surfaces of the thrust plate 23 and the bearing sleeve 13.

Further, a counter plate 16 consisting of a discoid member having a relatively large diameter is arranged in close proximity to the lower dynamic pressure surface of the thrust plate 23. This counter plate 16 is arranged so as to close the open part on the lower end side of the bearing sleeve 13, and the outer peripheral side part of the counter plate 16 is fixed to the bearing sleeve 13 side by caulking or the like.

Furthermore, non-illustrated thrust dynamic pressure generating grooves consisting of a herringbone shape or the like are formed on the lower dynamic pressure surface of the thrust plate 23, and a lower thrust dynamic pressure bearing portion SBb is thereby formed.

Both of the dynamic pressure surfaces on the thrust plate 23 side constituting one set of the thrust dynamic pressure bearing portions SBa and SBb arranged so as to be adjacent to each other in the axial direction and both of the dynamic pressure surfaces on the bearing sleeve 13 and counter plate 16 side opposed to the former surfaces in close proximity are respectively oppositely arranged through small gaps of several µm in the axial direction, and the lubricating fluid F such as an oil or a magnetic fluid is continuously injected or interposed in the bearing space formed by this small gap in the axial direction through the outer peripheral side path of the thrust plate 23. During rotation, a pressure is applied to the lubricating fluid F by the pumping effect of the thrust dynamic pressure generating grooves provided to the thrust plate 23, and a dynamic pressure is thereby generated. The rotary shaft 21 and the rotary hub 22 are axially supported in the non-contact state that they are lifted in the thrust direction by the dynamic pressure of the lubricating fluid F.

Here, the embodiment according to the present invention will now be described in more detail. A cylindrical screw hole 21a is formed on the lower end side of the rotary shaft 21 along the central axis of the rotary shaft 21. This screw hole 21a extends so as to have an appropriate length from the lower end side toward the upper end side of the rotary shaft 21, and the upper end side part of the screw hole 21a is formed into a closed bottomed hole. Furthermore, a female screw portion 21b is formed on the inner peripheral surface of the screw hole 21a over an appropriate axial length from the lower end side, and a part from the upper end part of the female screw portion 21b in the screw hole 21a to the closed bottom portion is formed into an incomplete screw portion in the lower hole state. Moreover, a screw non-occupied space 17 is formed between the end of a plate fixing screw 24 and the bottom of the lower hole of the screw hole 21a.

The plate fixing screw 24 as a headed screw used to fix the thrust plate 23 is screwed to the female screw portion 21b provided to the screw hole 21a. The plate fixing screw 24 has a male screw portion 24a which meshes with the female screw portion 21b of the rotary shaft 21. The male screw portion 24a extends from the screw head portion 24b in the axial direction (upper direction in FIG. 2). Additionally, the male screw portion 24a of the plate fixing screw 24 is inserted into a through hole 21a of the rotary shaft 21 from the lower end side and screwed to the female screw portion 21b. As a result, the screw head portion 24b is pressure-welded to the lower end surface side of the thrust plate 23 in FIG. 2. Consequently, the thrust plate 23 is sandwiched and fixed between the screw head portion 24b of the plate fixing screw 24 and the lower end surface of the rotary shaft 21 in the axial direction.

It is to be noted that the female screw portion 21b is formed so as to constitute a right screw when a recording medium such as a magnetic disk held by the rotary hub 22 rotates in the counterclockwise direction as seen from the upper side in FIG. 1. On the contrary, when the recording medium such as a magnetic disk rotates in the clockwise direction as seen from the upper side in FIG. 2, the female screw portion 21b is formed so as to constitute a left screw. This prevents the clamp fixing screw 24 from becoming loose due to a torque in activation of rotation of the motor.

In such a structure, although there is formed the screw non-occupied space 17 including the incomplete screw portion from the end portion of the female screw portion 24a of the plate fixing screw 24 to the closed bottom portion of the screw hole 21a and a part of the female screw portion 21b, an interposing member 25 which reduces a void cubic content of the screw non-occupied space 17 is attached in the screw non-occupied space 17. This interposing member 25 is formed of a substantially cylindrical member different from the plate fixing screw 24 and constituted so as to occupy the screw non-occupied space 17 as much as possible.

Further, the lubricating fluid F injected into each dynamic pressure bearing portion is filled in the void part extending from the gap of the screw portion where the male screw portion 24a of the plate fixing screw 24 engages with the female screw portion 21b of the screw hole 21a to the screw non-occupied space 17 around the interposing member 25. Injection of the lubricating fluid F is carried out through an injection path 27 provided so as to form a groove at the lower end portion of the rotary shaft 21, and the lubricating fluid F injected into each dynamic pressure bearing portion is led from the outside of the rotary shaft 21 in the radial direction to the screw portion in the screw hole 21a and the screw non-occupied space 17 around the interposing member 25 through the injection path 27.

In more detail, a plurality of the injection paths 27 are provided at the lower end surface part of the rotary shaft 21, which is in contact with the upper surface of the thrust plate 23, as radial grooves which pierce in the radial direction. Each of the injection paths 27 extends from the screw hole 21a of the rotary shaft 21 to the outer peripheral surface of the rotary shaft 21 toward the outside in the radial direction, and it is provided so as to cause the space in the screw hole 21a, i.e., the screw gap between the male screw portion 24a and the female screw portion 21b which engage with each other and the screw non-occupied space 17 around the interposing member 25 to communicate with the outside of the rotary shaft 21.

Furthermore, a non-illustrated tool engagement concave portion whose plane shape is a star shape and which is used for screw fastening is formed at the axial central part of the outer surface of the screw head portion 24b of the plate fixing screw 24. This tool engagement concave portion is formed in such a manner that its lateral cross section is recessed in the substantially triangular shape, and an adhesive having the oil resistance is filled therein after screw fastening. The adhesive is used to embed foreign particles such as a flash which may be possibly generated in the tool engagement concave portion by a scraping phenomenon when fastening the plate fixing screw 24, captures foreign particles such as a flash and prevents them from flowing out or scattering to the outside.

According to the dynamic pressure bearing apparatus having such a structure, since the thrust plate 23 is firmly fixed by the fastening force of the plate fixing screw 24 relative to the rotary shaft 21, the joint strength of the thrust plate 23 is greatly improved.

Moreover, the lubricating fluid F is filled in the void part extending from the gap between the male screws and the female screws of the plate fixing screw 24 and the screw hole 21a of the rotary shaft 21 to the screw non-occupied space 27 including the incomplete screw portion. Since the lubricating fluid F is used so that the air does not remain in the screw non-occupied space 17, the lubricating fluid F is excellently prevented from leaking outside by expansion of the residual air. Here, when filling the lubricating fluid F in the screw non-occupied space 17, the air can be prevented from remaining by forming a vacuum in the screw non-occupied space 17 in advance and then sucking and filling the lubricating fluid F.

Additionally, in this embodiment, since the interposing member 25 which reduces the void cubic content is attached to the screw non-occupied space 17, a filling quantity of the lubricating fluid F in the screw non-occupied space 17 is reduced by an amount of the interposing member, and leakage of the lubricating fluid F which has the thermal expansion property larger than that of each metal member constituting the dynamic pressure bearing portion can be further reduced.

Further, in the apparatus according to this embodiment, since the interposing member 25 formed as a member different from the plate fixing screw 24 is used, a general inexpensive headed screw can be used as the plate fixing screw 24.

Figure 3:
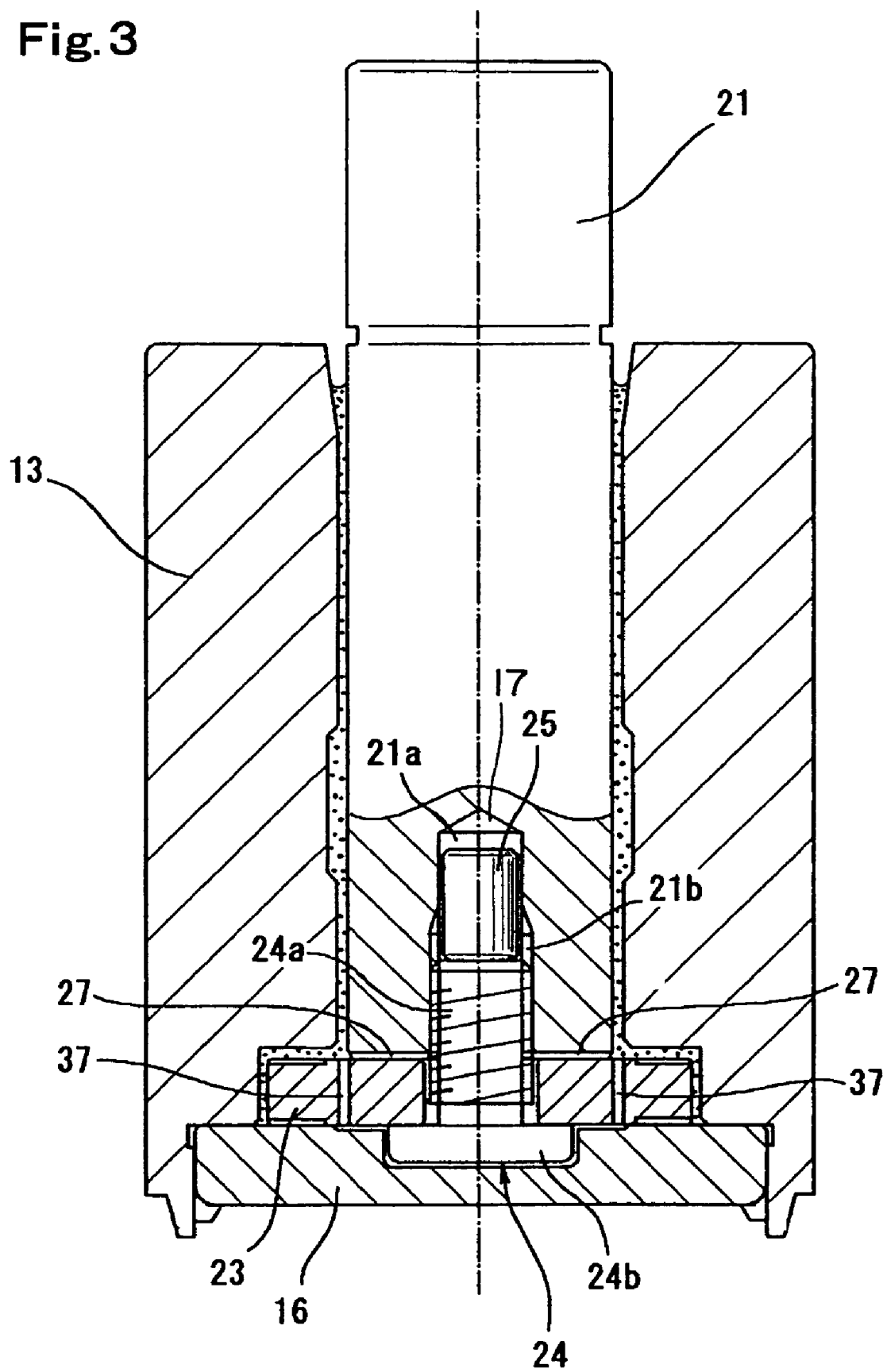
FIG. 3 is a vertical cross-sectional view showing another embodiment of the dynamic pressure bearing apparatus according to the present invention.

Furthermore, FIG. 3 shows a second embodiment. In this embodiment, besides the injection paths 27, there is provided a communication hole 37 which causes thrust bearing portions SBa and SBb constituted above and below the thrust plate 23 to communicate with each other. The communication hole 37 is a hole which pierces both front and back surfaces of the thrust plate in the axial direction in the middle of the thrust plate in the radial direction. It is to be noted that like reference numerals denote structures equal to those in the first embodiment.

Although this embodiment can obtain the same effects/ advantages as those in the first embodiment, it is possible to obtain the stable dynamic pressure characteristic in movement of the lubricating fluid F through the communication hole 37 even if a pressure difference is generated between both thrust bearing portions SBa and SBb in rotation of the motor by the communication hole 37.

Figure 4:
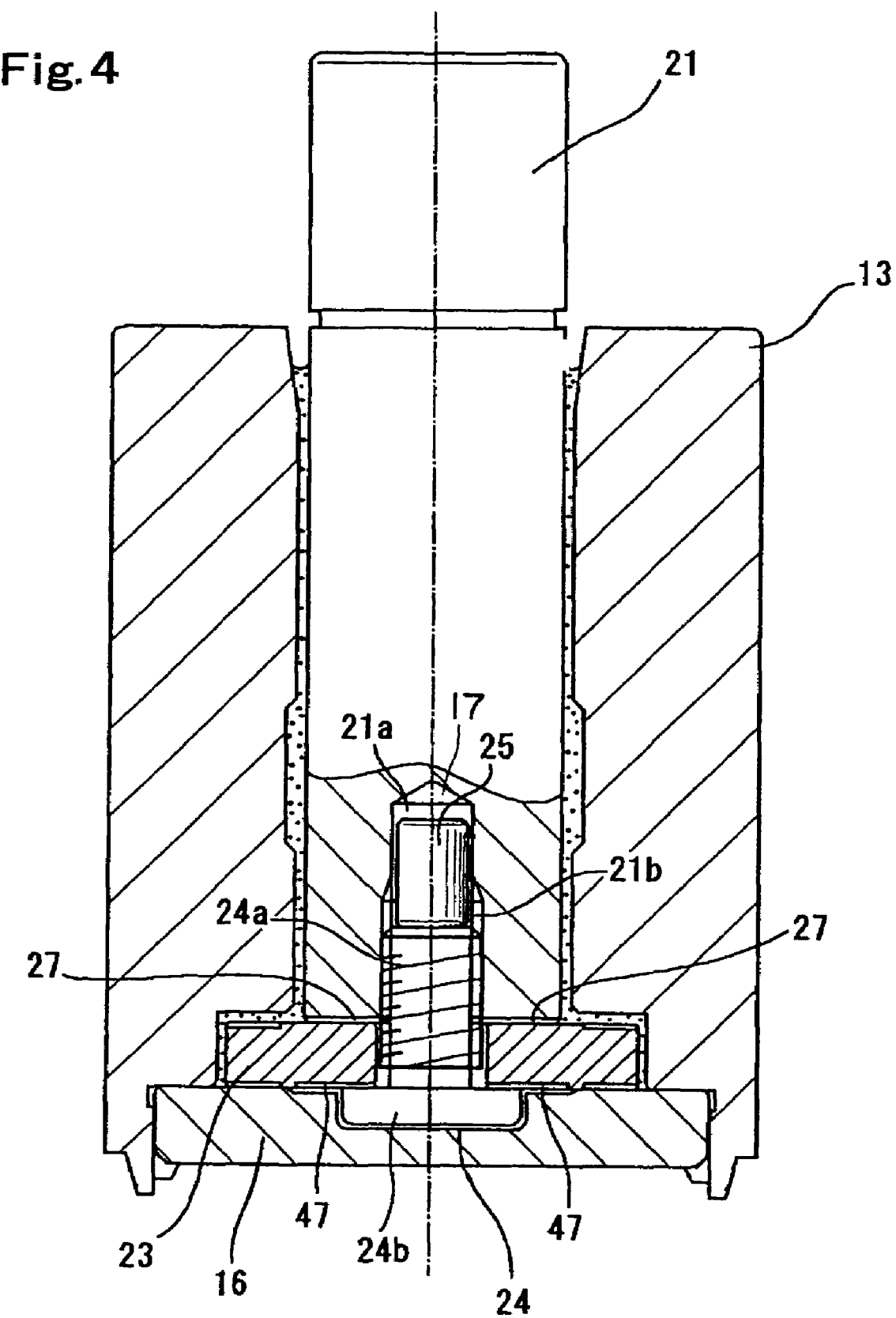
FIG. 4 is a vertical cross-sectional view showing still another embodiment of the dynamic pressure bearing apparatus according to the present invention.

Furthermore, FIG. 4 shows a third embodiment. In this embodiment, the injection path 27 is provided on the lower end surface of the shaft 21 like each of the foregoing embodiments. In addition to this, an injection path 47 consisting of a groove having the same shape as that of the injection path 27 is formed on the surface of the thrust plate 23 which comes into contact with the head portion 24b of the plate fixing screw 24. Moreover, both injection paths 27 and 47 are constituted so as to also function as the communication hole 37 (see FIG. 3) in the second embodiment.

That is, both injection paths 27 and 47 extend to the outer peripheral surface of the rotary shaft 21 from the screw hole 21a of the rotary shaft 21 toward the outside in the radial direction, and they are provided so as to cause the gap of the screw portion in the screw hole 21a and the screw non-occupied space 17 to communicate with the outside of the rotary shaft 21.

In such an embodiment according to the present invention, it is possible to obtain the same effects/advantages as those in each of the foregoing embodiments. In addition to this, since both injection paths 27 and 47 communicate with each other on the outer side of the rotary shaft 21, the lubricating fluid F appropriately moves through both injection paths 27 and 47 even if a pressure difference is generated between the upper and lower thrust bearing portions SBa and SBb, thereby obtaining the stable dynamic pressure characteristic.

Figure 5:
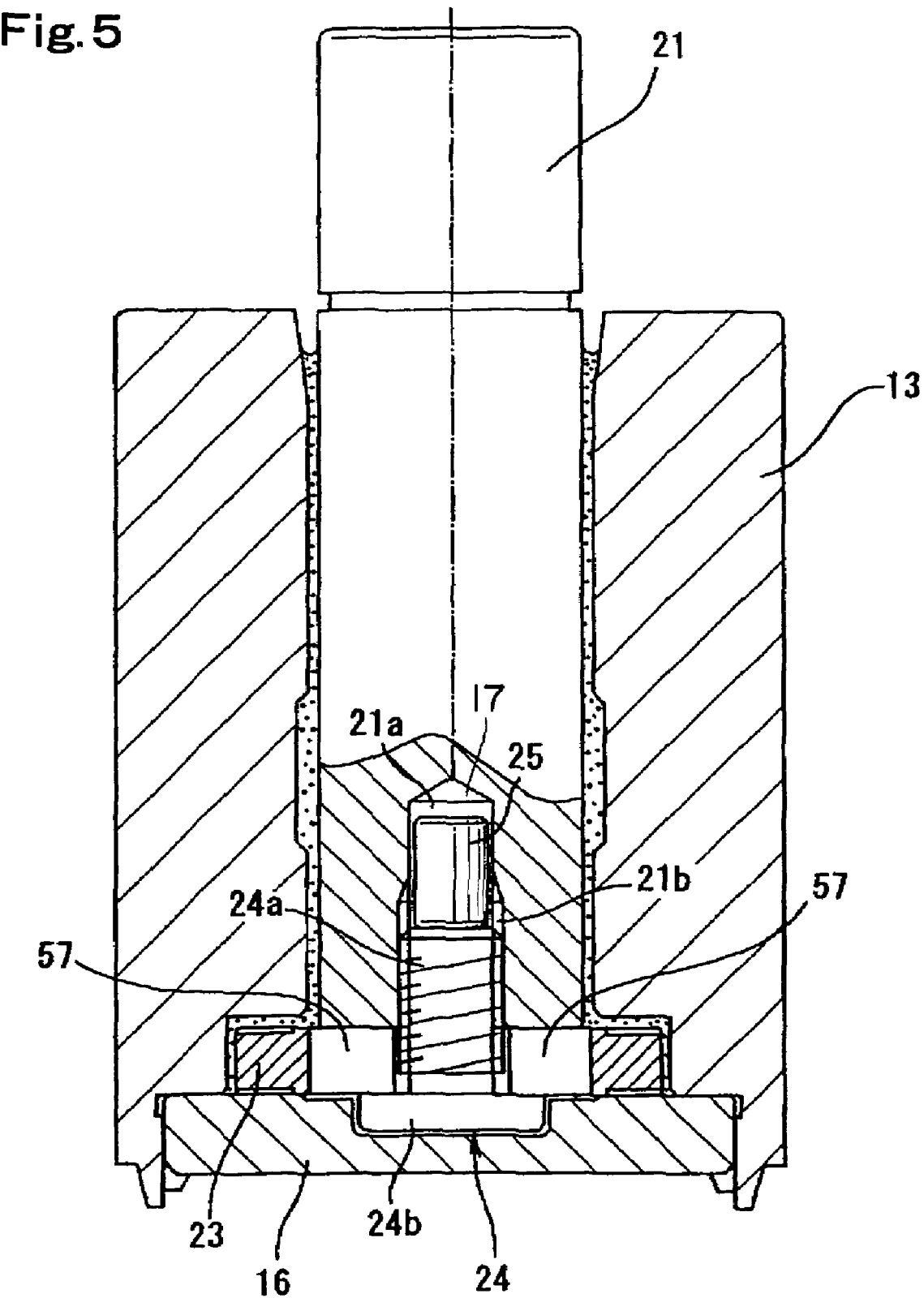
FIG. 5 is a vertical cross-sectional view showing yet another embodiment, in which an injection communication hole is provided, of the dynamic pressure bearing apparatus according to the present invention.
Figure 6:
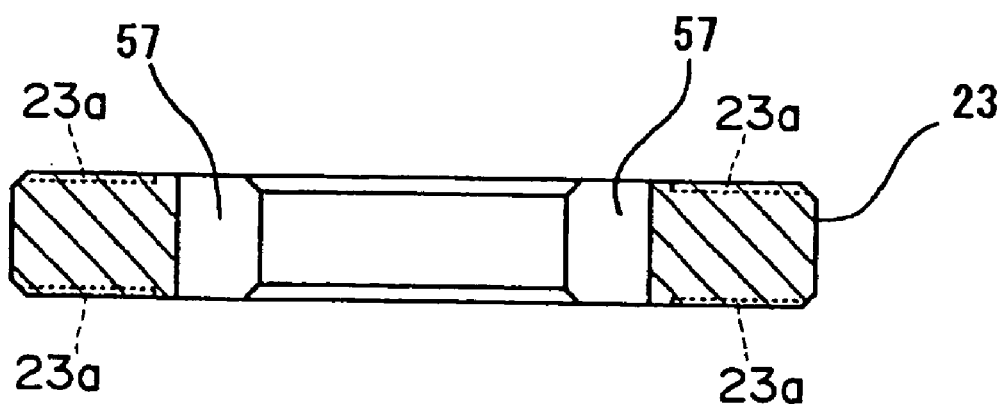
FIG. 6 is an enlarged vertical cross-sectional view showing a thrust plate used in the embodiment illustrated in FIG. 5.
Figure 7:
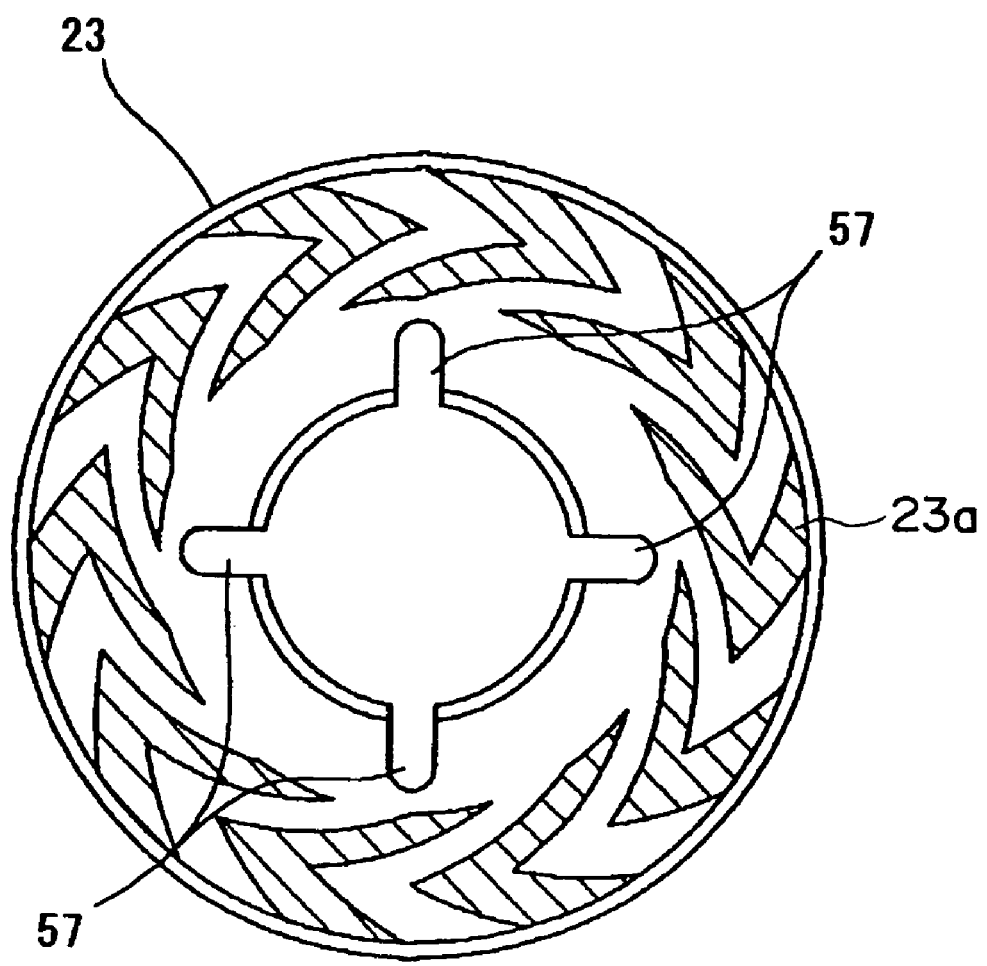
FIG. 7 is an enlarged plane view of the thrust plate used in the embodiment depicted in FIG. 5, showing grooves for generating a dynamic pressure by hatching.

Moreover, FIGS. 5 to 7 show a fourth embodiment. In this embodiment, in place of the injection path in the first to third embodiments, an injection communication groove 57 is formed so as to notch the inner peripheral surface of the thrust plate 23 in the radial direction. The injection communication grooves 57 are provided at four positions in the circumferential direction, and each injection communication groove 57 is formed in such a manner that its plane has a substantial U shape. Additionally, each injection communication groove 57 likewise extends to the outer peripheral surface of the rotary shaft 21 from the screw hole 21a of the rotary shaft 21 toward the outside in the radial direction, and it is provided so as to cause the gap of the screw portion in the screw hole 21a and the screw non-occupied space 17 to communicate with the outside of the rotary shaft 21, thereby facilitating injection of the lubricating fluid F. It is to be noted that reference numeral 23a in the drawing denotes a thrust dynamic pressure generating grooves.

Further, since the thrust bearing portions SBa and SBb communicate with each other in the axial direction by each injection communication groove 57, the lubricating fluid F appropriately moves through each injection communication groove 57 even if a pressure difference is generated between the upper and lower thrust bearing portions SBa and SBb during rotation of the motor, thereby obtaining the stable dynamic pressure characteristic.

Figure 8:
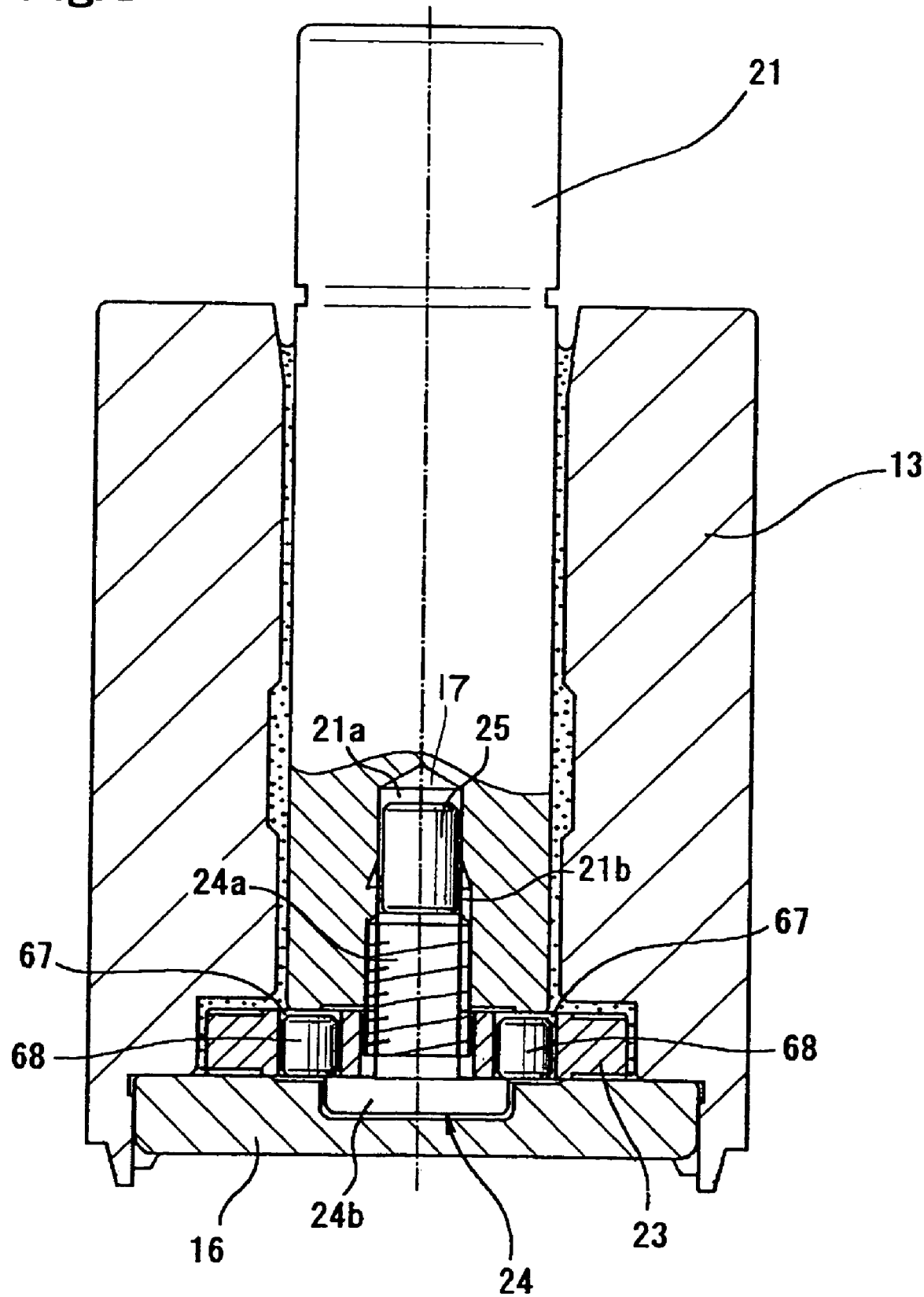
FIG. 8 is a vertical cross-sectional view showing yet another embodiment of the dynamic pressure bearing apparatus according to the present invention.
Figure 9:
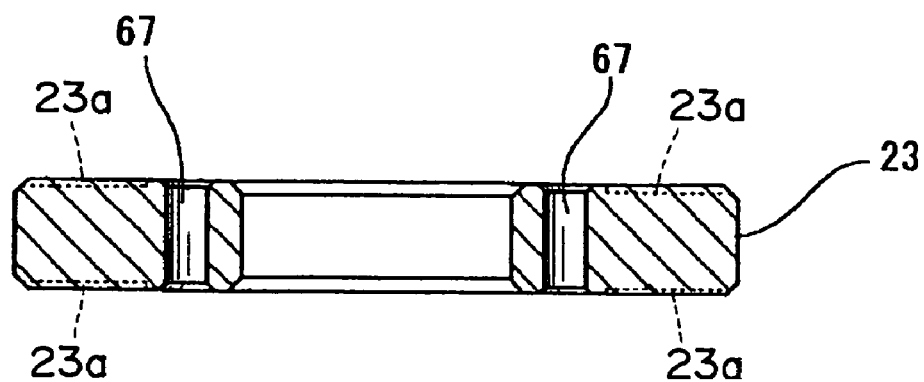
FIG. 9 is an enlarged vertical cross sectional view of the thrust plate used in the embodiment depicted in FIG. 8.
Figure 10:
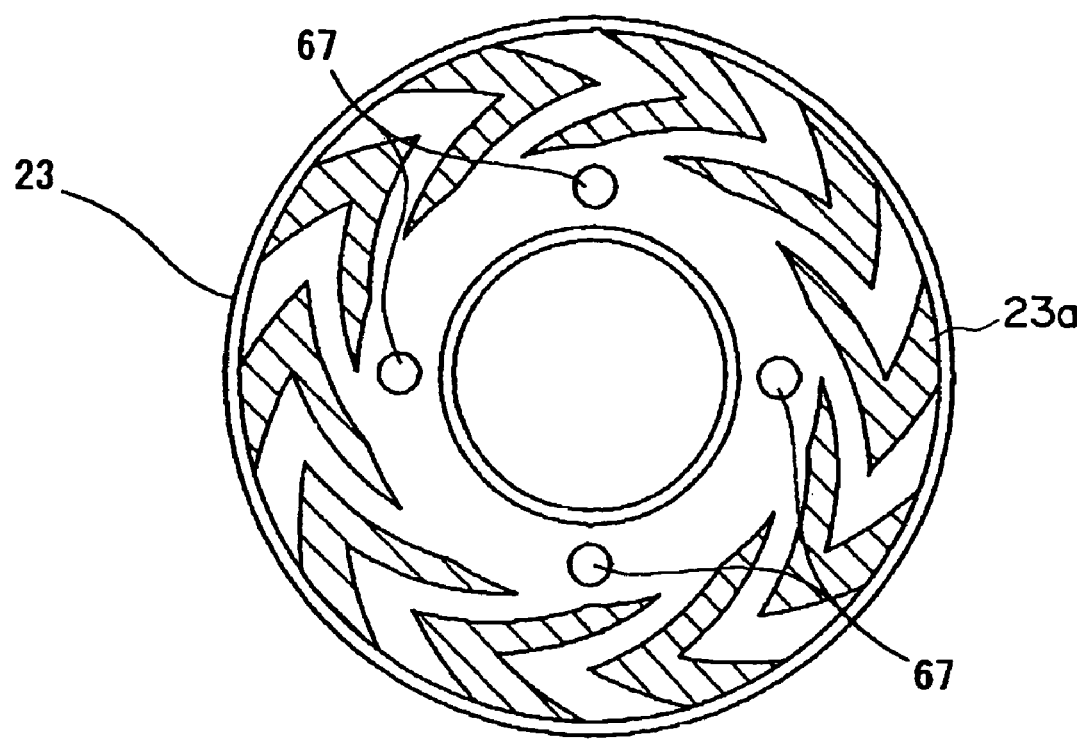
FIG. 10 is an enlarged plane view of the thrust plate used in the embodiment depicted in FIG. 8, showing grooves for generating a dynamic pressure by hatching.

FIGS. 8 to 10 show a fifth embodiment. In this embodiment, in place of the injection path or the communication groove in each of the first to fourth embodiments, an injection communication hole 67 is pierced and formed at the inner peripheral side part of the thrust plate 23 in the axial direction. The injection communication holes 67 are provided at four positions in the circumferential direction, and each of the injection communication holes 67 is formed so as to have a large-diameter shape which extends from the screw hole 21a of the rotary shaft 21 toward the outer peripheral surface of the rotary shaft 21 toward the outside in the radial direction. As a result, the screw portion gap in the screw hole 21a and the screw non-occupied space 17 are caused to communicate with the outside of the rotary shaft 21.

Furthermore, since the thrust bearing portions SBa and SBb communicate with each other in the axial direction by the injection communication holes 67, the lubricating fluid F appropriately moves through each injection communication hole 67 even if a pressure difference is generated between the upper and lower thrust bearing portions SBa and SBb during rotation of the motor, thereby obtaining the stable dynamic pressure characteristic.

At this moment, an interposing member 68 which reduces an internal cubic content of the injection communication hole 67 is inserted into each injection communication hole 67 having a large diameter. This interposing member 68 is formed so as to have a diameter which occupies a larger space in the injection communication hole 67. Arranging such an interposing member 68 can reduce a quantity of the lubricating fluid which enters the injection communication hole 67, thereby excellently avoiding flowing out of the lubricating fluid when expanded. Moreover, changing a size of the interposing member 68 can adjust a passage quantity of the lubricating fluid F.

Figure 11:
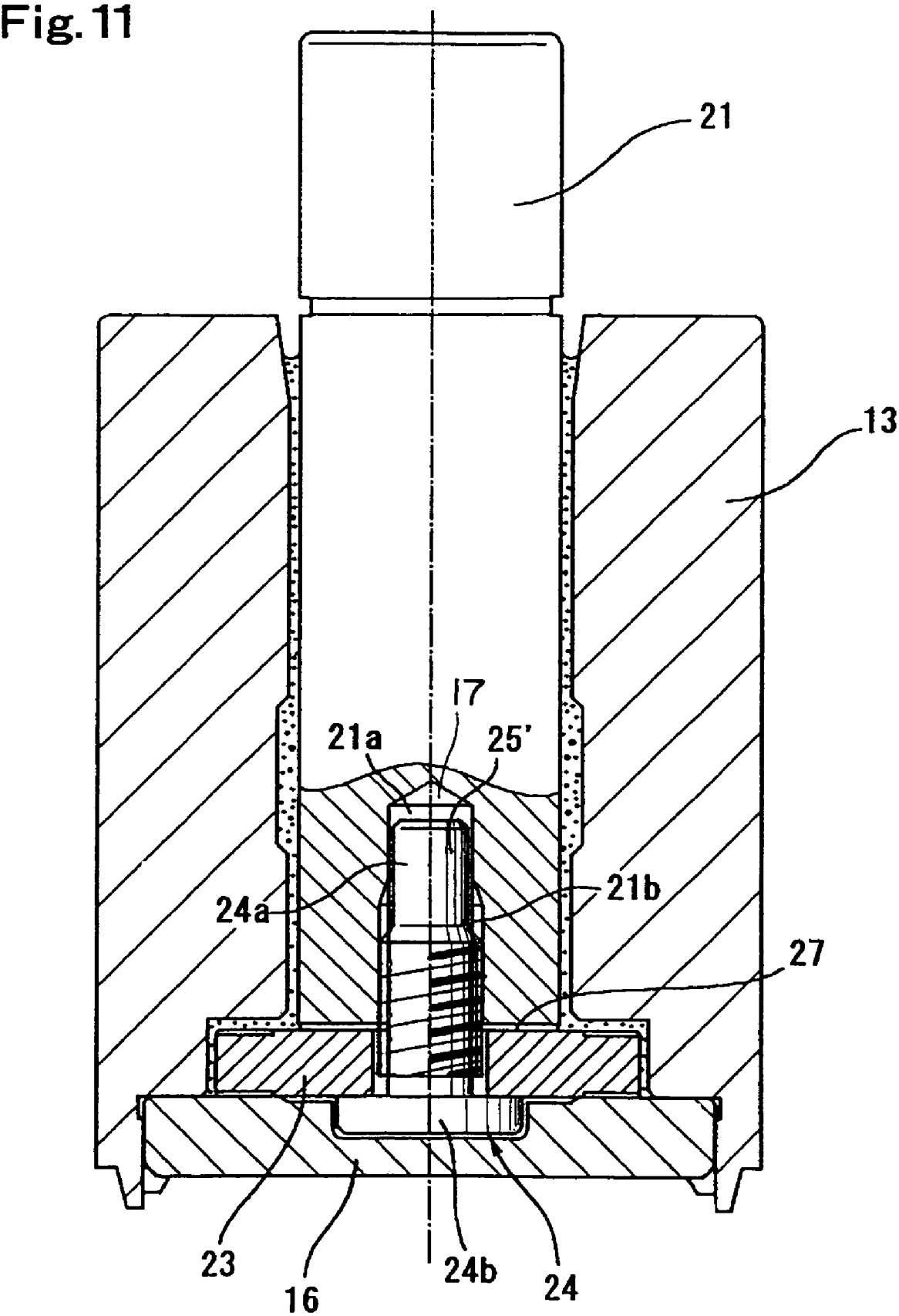
FIG. 11 is a vertical cross-sectional view showing a further embodiment of the dynamic pressure bearing apparatus according to the present invention.

Additionally, FIG. 11 shows a sixth embodiment. This embodiment adopts an interposing member 25' integrally provided with the plate fixing screw 24 in place of the interposing member 25 in the first embodiment. The interposing member 25' is formed so as to integrally protrude from the end of the plate fixing screw 24.

In this embodiment, the same effects/advantages as those in each of the foregoing embodiments can be obtained. However, in this embodiment in particular, attachment of the interposing member 25' is carried out simultaneously with fastening of the plate fixing screw 24, which facilitates handling of the components and simplifying the assembling steps.

Figure 12:
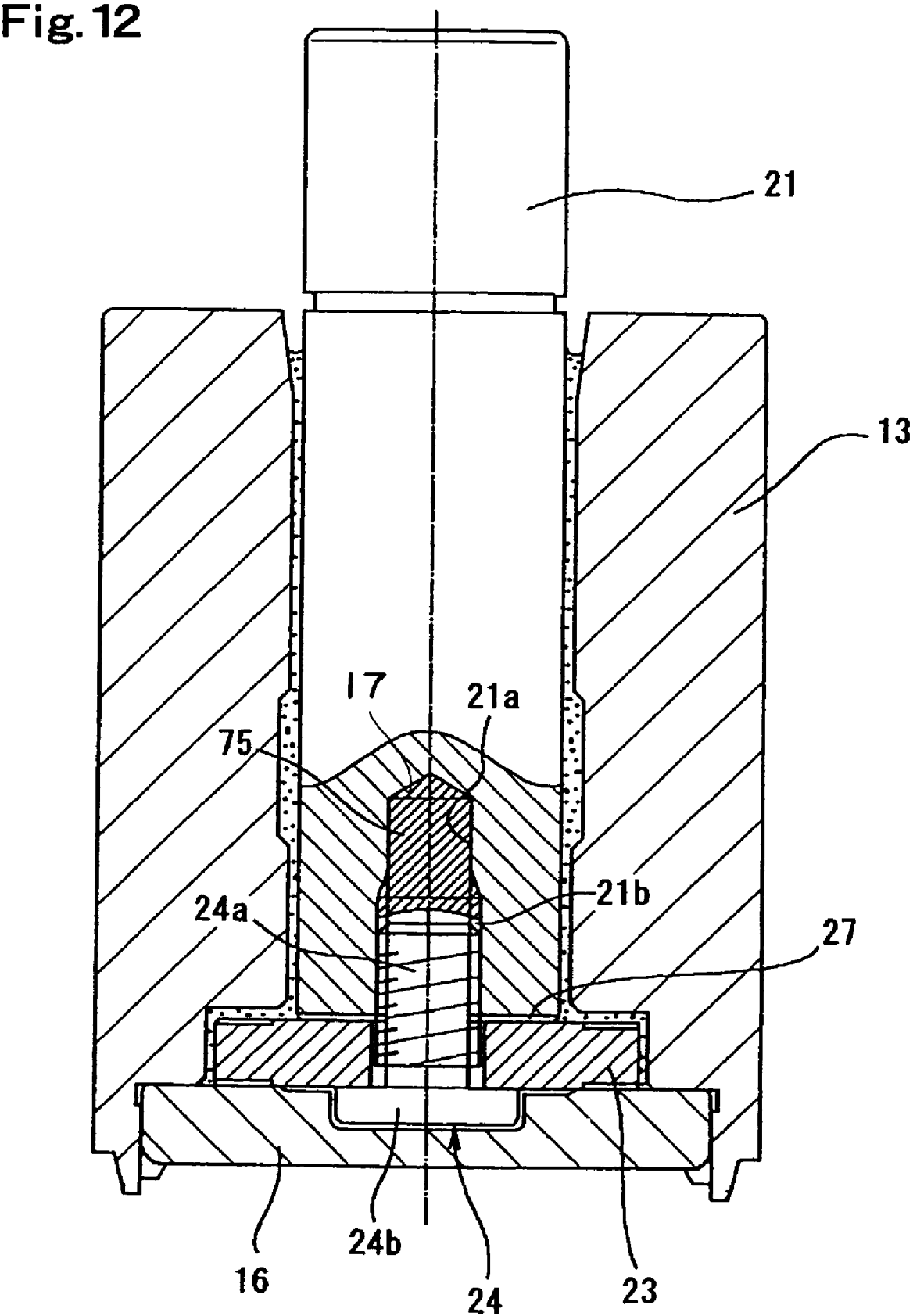
FIG. 12 is a vertical cross-sectional view showing a still further embodiment of the dynamic pressure bearing apparatus according to the present invention using a resin solid body as an interposing member.

Further, FIG. 12 shows a seventh embodiment. In this embodiment, a resin material 75 is used in place of the interposing member 25 in the first embodiment. This resin material 75 is injected into the screw non-occupied space 17 formed between the illustrated upper end portion of the plate fixing screw 24 and the closed bottom portion of the screw hole 21a on the rotary shaft 21 side, and it is hardened in the screw non-occupied space 17.

In such an embodiment according to the present invention, the same effects/advantages as those in each of the foregoing embodiments can be obtained. However, in this embodiment particularly, since the screw non-occupied space 17 is substantially completely filled with the resin material 75, a large quantity of the lubricating fluid F in the thrust dynamic pressure bearing portions SBa and SBb does not enter the screw hole 21a, it is possible to eliminate the possibility that the lubricating fluid F is substantially insufficient in the thrust dynamic pressure bearing portions SBa and SBb and the duration of life of the bearing is shortened. Furthermore, since a general headed screw can be used as a headed screw, the component cost can be reduced.

Moreover, it is possible to form the large surface roughness at parts corresponding to the injection path, the communication hole, the injection communication groove or the injection communication hole in each of the embodiments in place of these paths. In such a case, the gaps generated by irregularities of the large surface roughness can be formed into substantial paths or the like.

Figure 13:
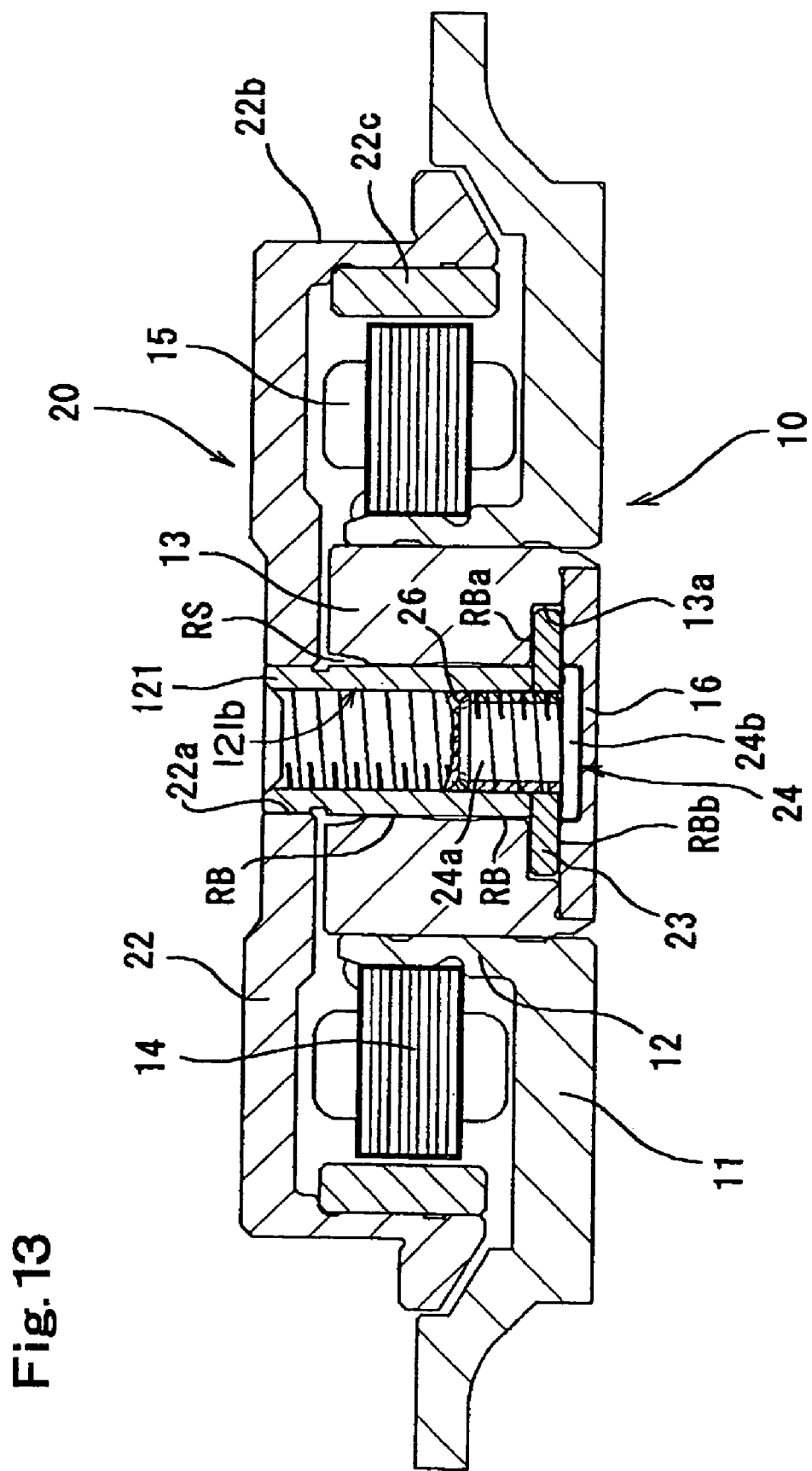
FIG. 13 is a vertical cross-sectional view showing an embodiment of an HDD using the dynamic pressure bearing apparatus according to the embodiment having a through screw hole according to the present invention.

FIG. 13 shows an eighth embodiment. In this embodiment, a screw hole for the plate fixing screw 24 is provided by piercing the shaft 121 in the axial direction. It is to be noted that the entire structure of the HDD to which the present invention is applied is equivalent to that illustrated in FIG. 1. Therefore, in this example, explanation of the structure of the HDD is eliminated, and like reference numerals denote members having the same functions, thereby omitting the detailed description.

Figure 22:
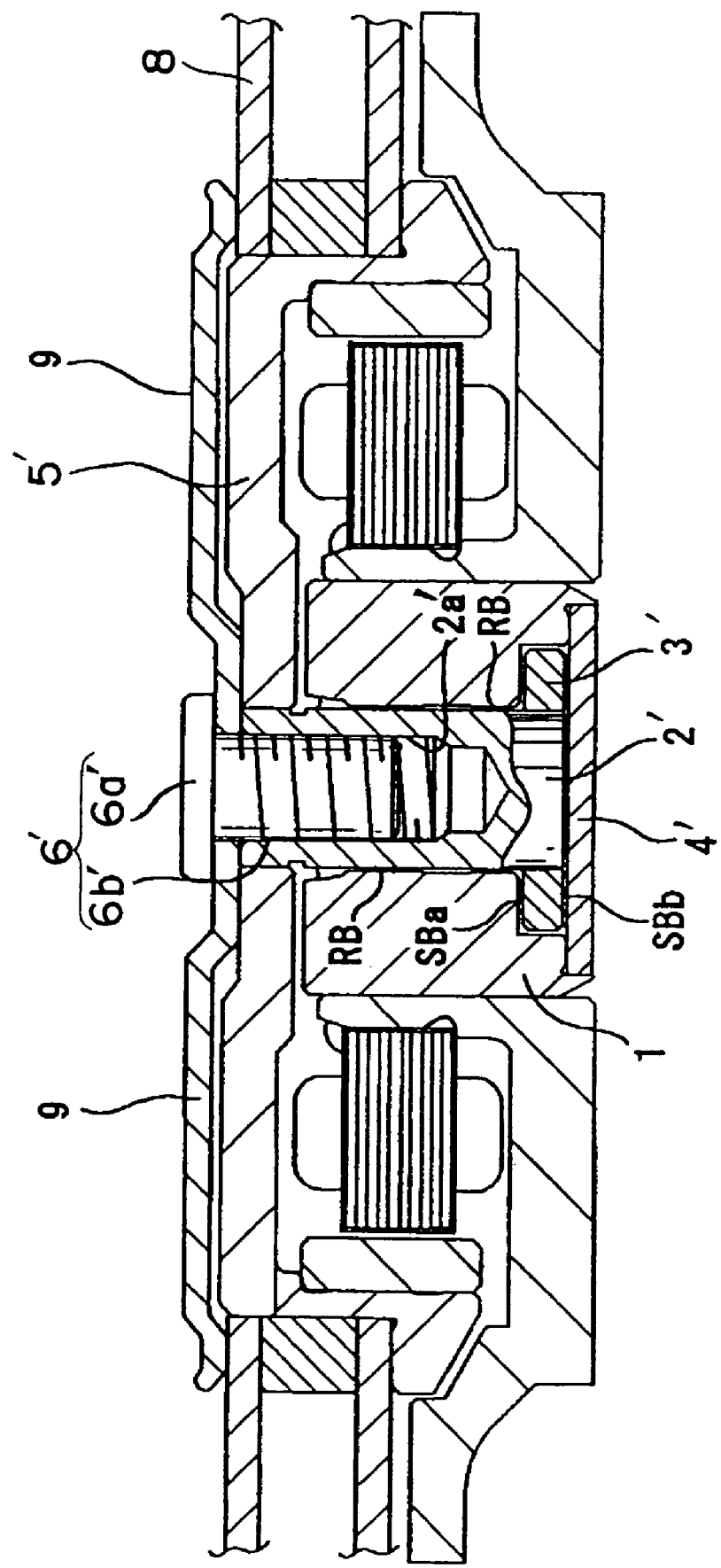
FIG. 22 is a vertical cross-sectional view showing an entire structure of an HDD including another conventional dynamic pressure bearing apparatus.

To the rotary shaft 121 in this embodiment is formed a through hole 121a so as to be parallel with the central axis of the rotary shaft 121, and the upper and lower ends of the rotary shaft 121 in the axial direction are caused to communicate in the axial direction by the through hole 121a. A female screw portion 121b is formed at the inner wall portion forming the cylindrical shape of the through hole 121a, and a non-illustrated clamp fixing screw (see reference numeral 6' in FIG. 22) is screwed at the part on the upper end side of the female screw portion 121b. The screw head portion of the clamp fixing screw is pressure-welded to a disk fixing damper (see reference numeral 9 in FIG. 22), and the damper is fixed by the fastening force of the clamp fixing screw.

Additionally, a plate fixing screw 24 as a headed screw used for fixing the thrust plate 23 is screwed on the lower end side of the female screw portion 121b formed on the inner wall of the through hole 121a of the rotary shaft 121. This plate fixing screw 24 has a male screw portion 24a which meshes with the female screw portion 121b of the rotary shaft 121, and the male screw portion 24a is provided so as to extend from the screw head portion 24a in the axial direction. Further, the male screw portion 24a of the plate fixing screw 24 is inserted into the through hole 121a of the rotary shaft 121 from the lower side and screwed to the female screw portion 121b. As a result, the screw head portion 24b is pressure-welded to the lower end of the thrust plate 23.

At this moment, the thrust plate 23 is sandwiched in the axial direction between the screw head portion 24b of the plate fixing screw 24 and the lower end surface of the rotary shaft 121, thereby fixing the thrust plate 23.

Further, a washer 125 is interposed between the screw head portion 24b of the plate fixing screw 24 and the thrust plate 23. This washer 125 is used to eliminate foreign particles such as a flash which may be possibly generated by a scraping phenomenon when fastening the plate fixing screw 24. Thus, as the washer 25, a washer made of a resin such as PTFE or PEEK or a metal washer having the high hardness and the excellent smoothness is used.

Furthermore, at a screwing portion between the male screw portion 24a of the plate fixing screw 24 and the female screw portion 121b on the rotary shaft 121 side, i.e., meshed screw portion, an adhesive 126 having the oil resistance such as an epoxy resin is filled at a part extending from the substantially entire length of the screwing portion to the end portion of the plate fixing screw 24. This adhesive 126 is injected so as to enter the gap generated in the screwing portion of the plate fixing screw 24 from the upper side after fixation using the plate fixing screw 24, and it is filled so as to seal the through hole 121a in the axial direction. Therefore, the adhesive 126 is used to completely prevent the lubricating fluid F from leaking to the outside, and looseness of the plate fixing screw 24 is avoided.

At this moment, the adhesive 126 is injected to the inner side of the through hole 121a through the open portion on the upper end side of the through hole 121a provided to the rotary shaft 121. Therefore, the air pressurized on the inner side of the through hole 121a when the adhesive 126 is injected is discharged toward the outer side in the radial direction of the rotary shaft 121 through ventilation paths 127 provided so as to form groove shapes at the lower end part of the rotary shaft 121.

In more detail, the ventilation paths 127 are recessed at four positions in the circumferential direction at a part of the thrust plate 23 which comes into contact with the lower end portion of the rotary shaft 121. Each ventilation path 127 extends toward the outside in the radial direction from the edge on the inner peripheral side of the central hole portion 23c of the thrust plate 23, and it is formed so as to reach the outer position from the outer peripheral surface of the rotary shaft 121. Further, the internal space of the through hole 121a formed at the part extending from the contact portion of the thrust plate 23 and the lower end portion of the rotary shaft 121 to the part that the adhesive 126 is filled in is caused to communicate with the outside of the rotary shaft 121 by each ventilation path 127.

Figure 14:
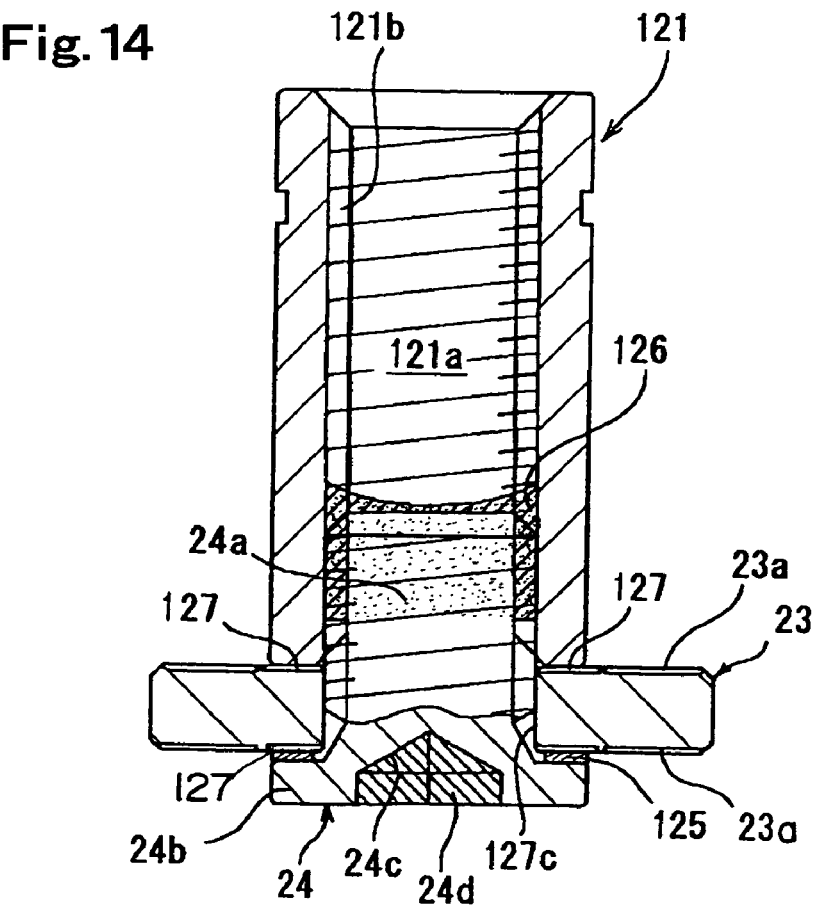
FIG. 14 is an enlarged vertical cross-sectional view of a dynamic pressure bearing apparatus depicted in FIG. 13.
Figure 15:
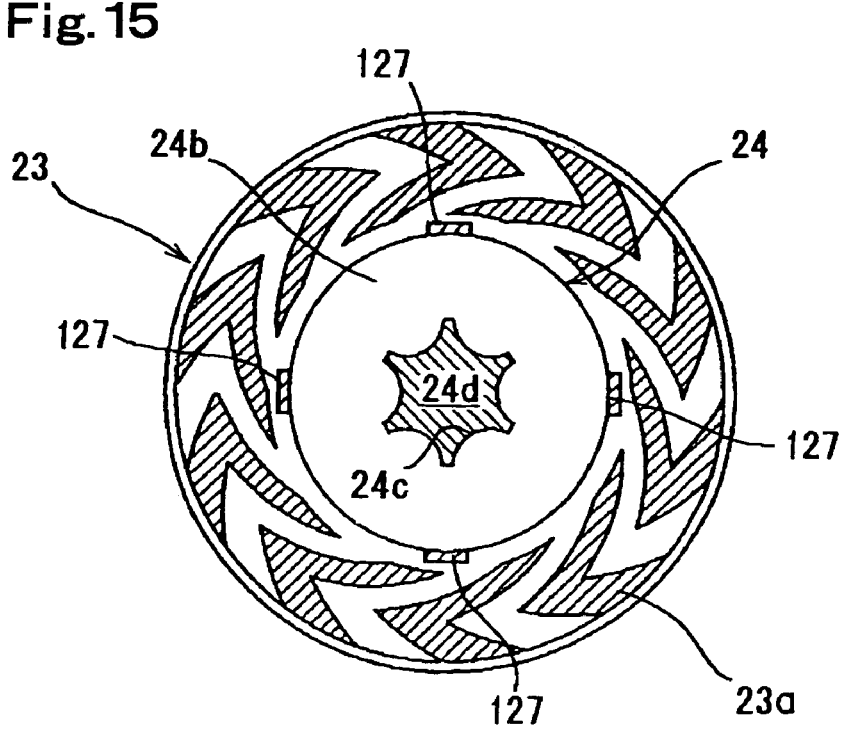
FIG. 15 is a bottom view showing a screw fixing structure of the dynamic pressure bearing apparatus depicted in FIG. 14, showing grooves for generating a dynamic pressure and a filling resin by hatching.
Figure 16:
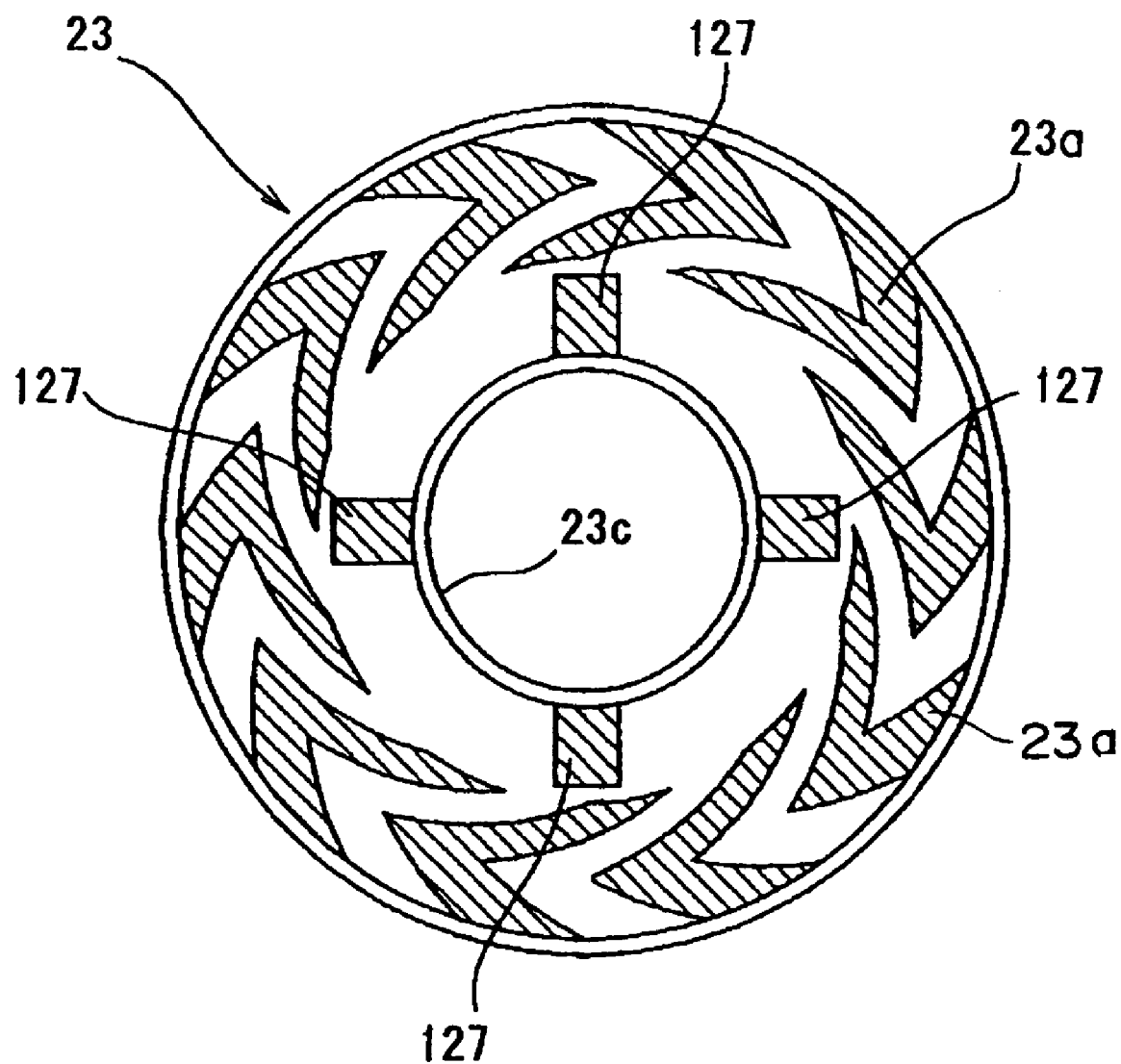
FIG. 16 is a plane view of the dynamic pressure bearing apparatus depicted in FIG. 14, showing grooves for generating a dynamic pressure and a ventilation path by hatching.

Furthermore, as shown in FIGS. 14 and 15 in particular, at the screw head portion 24b of the plate fixing screw 24, a tool engagement concave portion 24c which is used for screw fastening and whose plane has a star shape is formed at the axial central part on the outer surface of the screw head portion 24b. This tool engagement concave portion 24c is provided in such a manner that its vertical cross section is recessed in the substantially triangular shape, and an adhesive 24d having the oil resistance is filled therein after screw fastening. The adhesive 24d is used to embed foreign matters such as a flash which may be possibly generated in the tool engagement concave portion 24c by the scraping phenomenon or the like when fastening the plate fixing screw 24, and this adhesive 24d prevents foreign matters such as a flash from flowing out/scattering to the outside.

In this embodiment having such a configuration, when the plate fixing screw 24 is fastened to the rotary shaft 121, the thrust plate 23 is firmly fixed. Therefore, the joint strength of the thrust plate 23 can be greatly improved as compared with that obtained by conventional press fitting and the like.

Moreover, in this embodiment, since the through hole 121a used to form the female screw portion 121b to the rotary shaft 121 is formed, the lower hole with a maximum length is provided in the axial direction. Additionally, the female screw portion 121b is formed to the lower hole consisting of the through hole 121a with the maximum length by a thread cutting tool having an extra machining length, thereby more easily and efficiently performing machining.

Further, foreign particles such as flashes generated in machining or the like of the female screw portion 121b can be readily discharged to the outside through the open portion of the through hole 121a, thereby obtaining the excellent cleanliness.

Furthermore, in this embodiment, since the adhesive 126 which seals the gap in the screw portion and prevents the lubricating fluid from leaking to the outside is filled in the screwing portion between the male screw portion 24a of the plate fixing screw 24 and the female screw portion 121b of the rotary shaft 121, the lubricating fluid which tends to flow out via the through hole 121a can be sealed, and looseness of the plate fixing screw 24 can be assuredly avoided by the adhesive 126.

Furthermore, when injecting the adhesive 126 into the through hole 121a of the rotary shaft 121, the injection operation can be very easily carried out through the open portion of the through hole 121a, and the air in the through hole 121a which is pressurized at the time of injection of the adhesive 126 is discharged to the outside through the ventilation path 127, thus excellently effecting the filling operation of the adhesive 126.

Moreover, in this embodiment, since the tool engagement concave portion 24c for fastening provided at the screw head portion 24b of the plate fixing screw 24 is filled with the adhesive 24d having the oil resistance, chip pieces such as flashes are held on the inner side of the adhesive 24d even if such chip pieces are generated in the tool engagement concave portion 24c of the screw head portion 24b in the screw fastening operation relative to the plate fixing screw 24, and scattering to the outside is assuredly avoided, thereby obtaining the excellent cleanliness.

Figure 17:
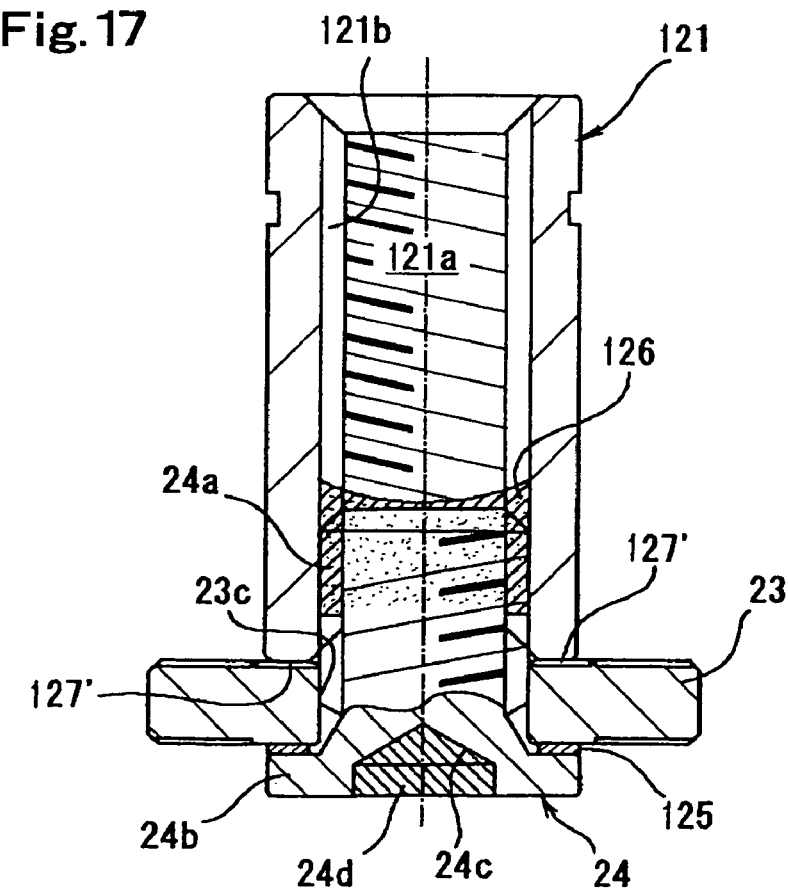
FIG. 17 is a vertical cross sectional view showing a yet further embodiment of the dynamic pressure bearing apparatus having a through screw hole according to the present invention.
Figure 18:
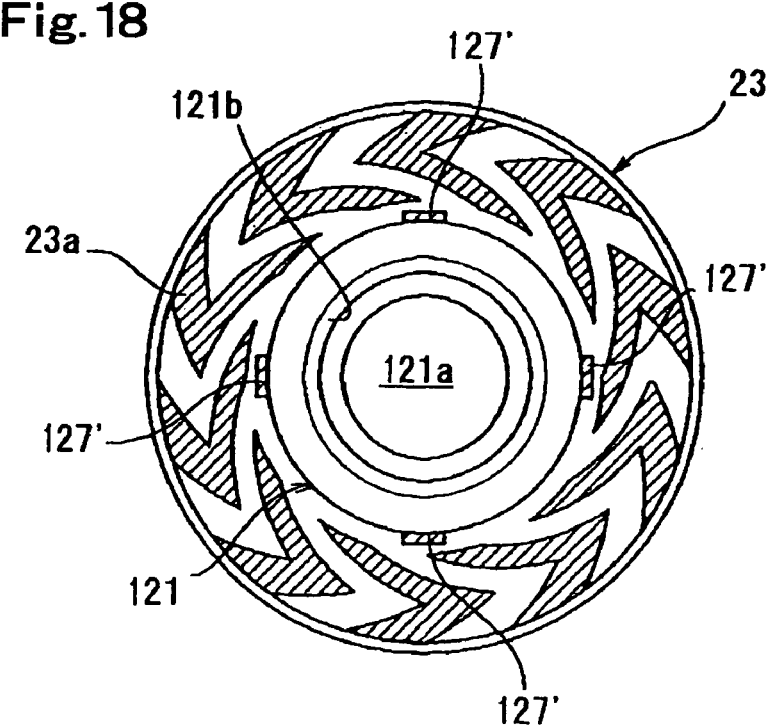
FIG. 18 is a plane view of the dynamic pressure bearing apparatus depicted in FIG. 17, showing grooves for generating a dynamic pressure and a ventilation path by hatching.

FIGS. 17 and 18 show a ninth embodiment. In this embodiment, ventilation paths 127' are provided to the thrust plate 23. That is, the ventilation paths 127' in this embodiment are formed at parts where the thrust plate 23 is in contact with the screw head portion 24b of the plate fixing screw 24.

Figure 19:
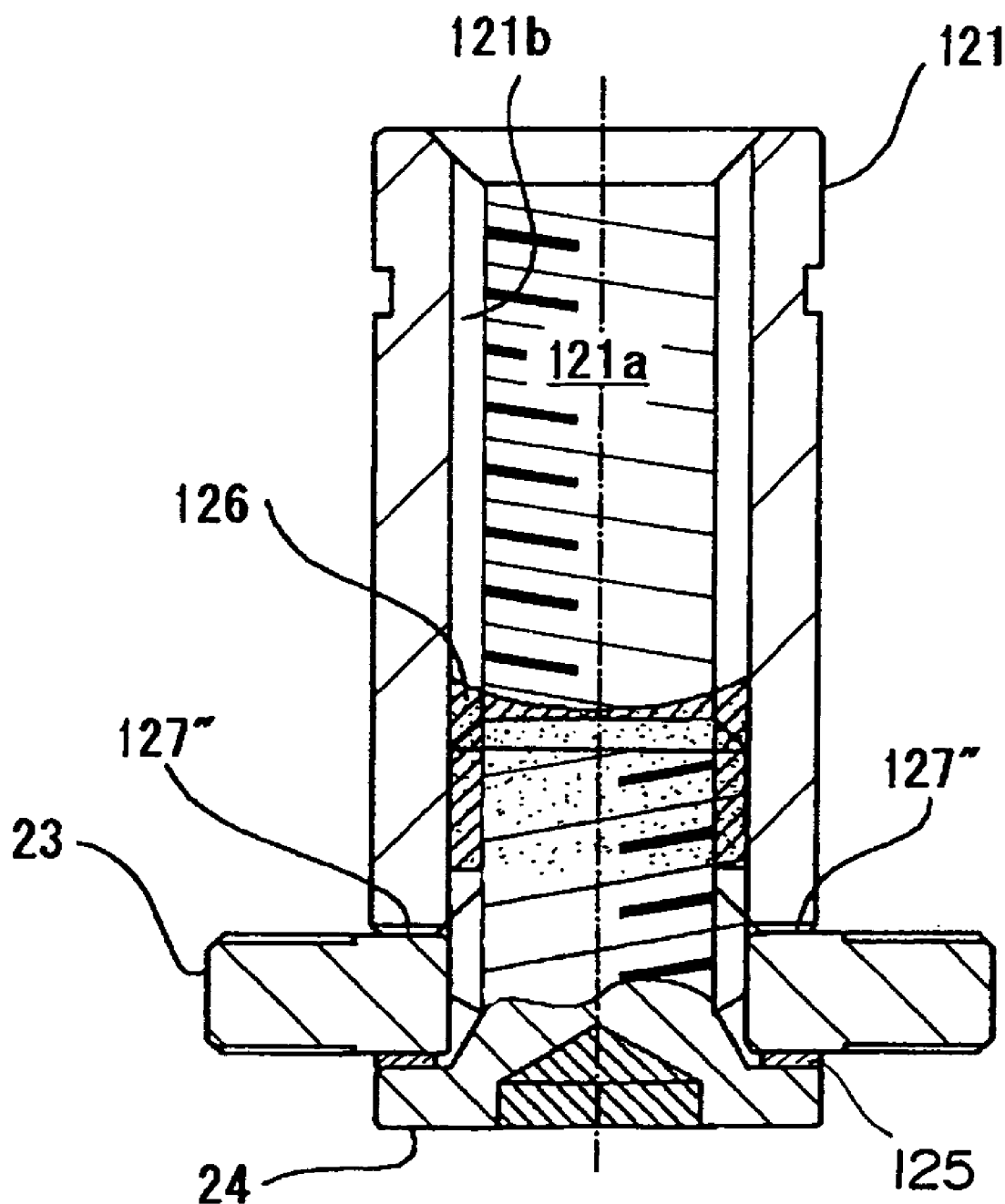
FIG. 19 is a vertical cross-sectional view showing another embodiment of the dynamic pressure bearing apparatus according to the present invention.

FIG. 19 shows a tenth embodiment. In this embodiment, ventilation paths 127" are provided on the lower end surface side of the rotary shaft 121 rather than the thrust plate 23 side. In such an embodiment, the same effects/advantages as those in the eighth embodiment can be demonstrated.

Figure 20:
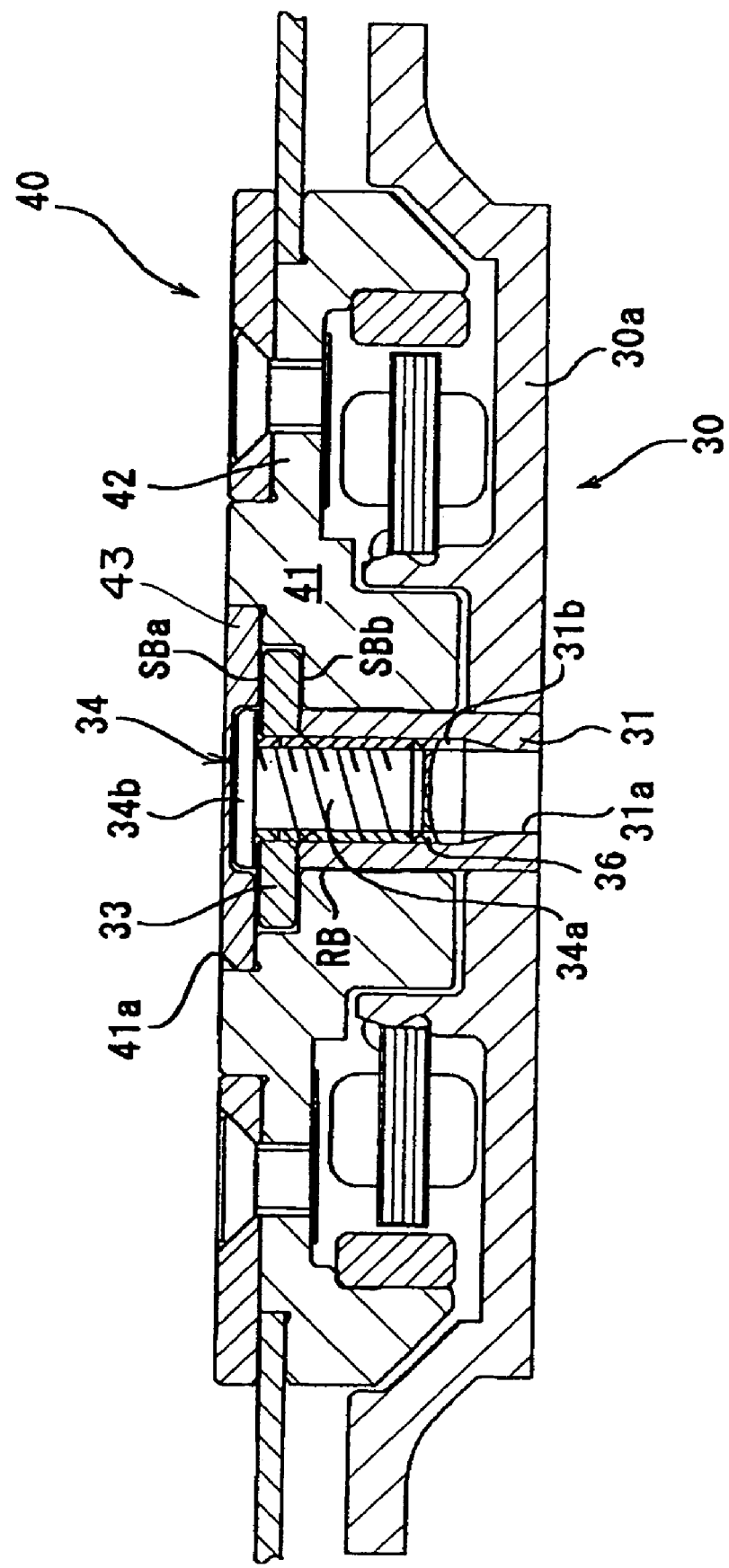
FIG. 20 is a vertical cross-sectional view showing an entire structure of an HDD including the shaft fixing type dynamic pressure bearing apparatus according to an embodiment of the dynamic pressure bearing apparatus of the present invention.
Figure 21:
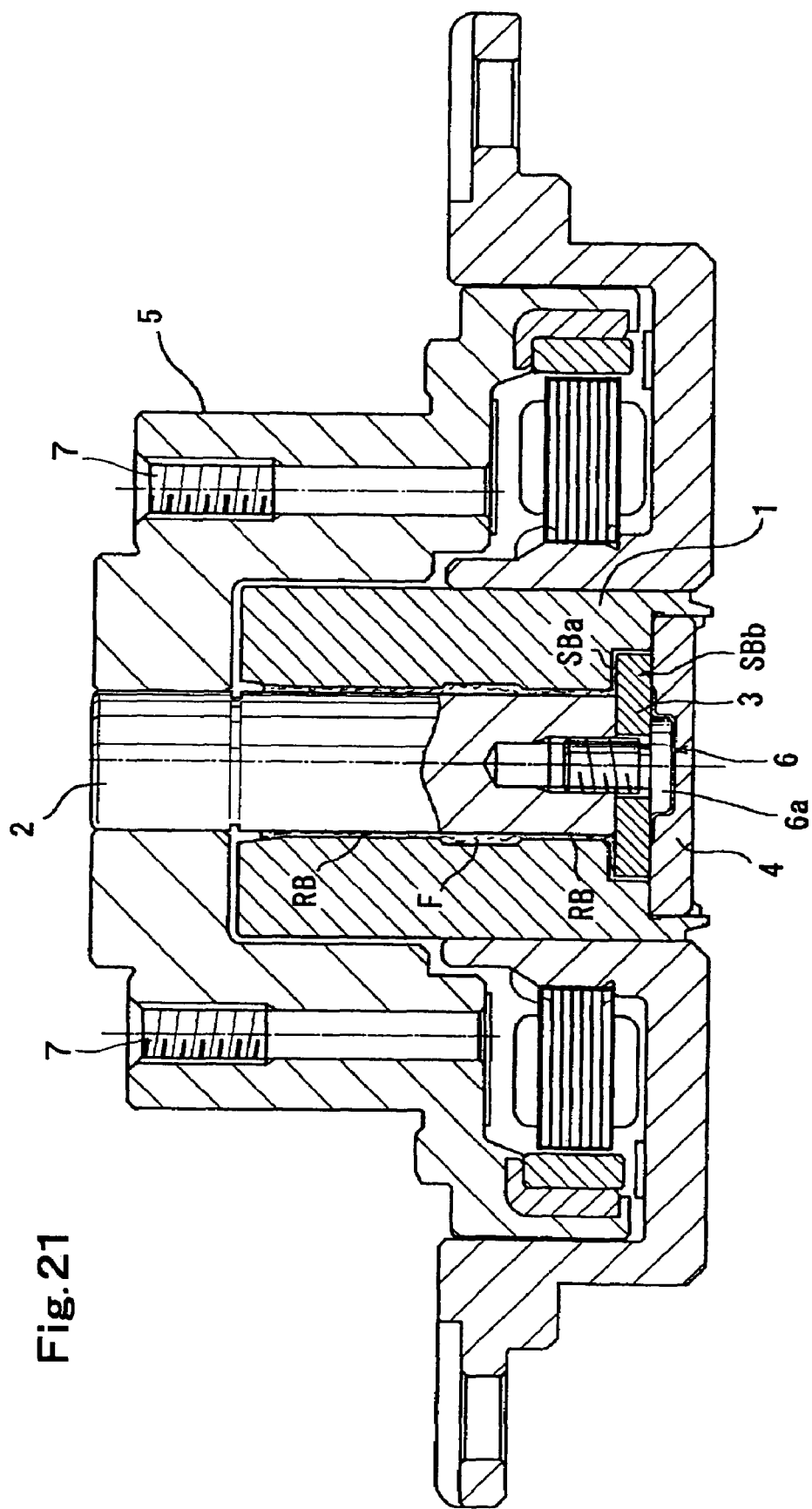
FIG. 21 is a vertical cross-sectional view showing an entire structure of an HDD including a conventional dynamic pressure bearing apparatus.

Further, FIG. 20 shows an embodiment where the present invention is applied to a fixed shaft type dynamic pressure bearing apparatus. In this embodiment, a bearing hole of the bearing sleeve 41 as a bearing constituting the rotor set 40 is rotatably inserted into the outer peripheral of the fixed shaft 31 fixed so as to be erected relative to the base frame 30a constituting the stator set 30. Furthermore, a dynamic pressure surface formed on the inner peripheral surface of the bearing hole in the bearing sleeve 41 is arranged so as to face the dynamic pressure surface formed on the outer peripheral surface of the fixed shaft 31 in the radial direction, and two radial dynamic pressure bearing portions RB and RB are formed in a small gap between the dynamic pressure surfaces so as to be separated from each other in the axial direction.

The dynamic pressure surface on the bearing sleeve 41 side in each radial dynamic pressure bearing portion RB and the dynamic pressure surface on the fixed shaft 31 side are arranged so as to be opposed to each other in the circumferential form with a small gap of approximately several $\mu m$ therebetween, and a predetermined lubricating fluid consisting of a lubricating oil, a magnetic fluid or the like is continuously injected into a small gap which includes the radial dynamic pressure bearing portion RB formed between these surfaces and extends in the axial direction. Furthermore, the lubricating fluid F is pressurized by the pumping effect of the non-illustrated radial dynamic pressure generating grooves during rotation, and a dynamic pressure is generated. A rotary hub 42 integrally formed with the bearing sleeve 41 is axially supported while being lifted in the radial direction by the dynamic pressure of the lubricating fluid F.

Moreover, a discoid thrust plate 33 is fixed at the illustrated upper end portion of the fixed shaft 31 by a later-described plate fixing screw 34. This thrust plate 33 is arranged so as to be accommodated in the annular concave portion 41a provided at the central part on the upper end side of the bearing sleeve 41, and the dynamic pressure surface provided on the illustrated upper side surface of the thrust plate 33 is arranged so as to be opposed to the dynamic pressure surface provided to the bearing sleeve 41 in close proximity in axial direction in the concave portion 41a of the bearing sleeve 41. Additionally, although not shown, for example, herringbone-shaped thrust dynamic pressure generating grooves are formed on the dynamic pressure surface on the illustrated upper side of the thrust plate 33, and the lower thrust dynamic pressure bearing portion SBa is formed at the gap portion between the opposed dynamic pressure surfaces of the thrust plate 33 and the bearing sleeve 41.

Further, a counter plate 43 consisting of a discoid member having a relatively large diameter is arranged in close proximity to the upper dynamic pressure surface of the thrust plate 33. This counter plate 43 is arranged so as to close the open portion on the upper end side of the bearing sleeve 41, and the outer peripheral side portion of the counter plate 43 is fixed to the bearing sleeve 41 side.

Furthermore, although not shown, for example, herringbone-shaped thrust dynamic pressure generating grooves are formed on the upper dynamic pressure surface of the thrust plate 33, and the upper thrust dynamic pressure bearing portion SBb is thereby formed.

Both dynamic pressure surfaces on the thrust plate 33 side constituting one set of the thrust dynamic pressure bearing portions SBa and SBb arranged so as to be adjacent to each other in the axial direction and both dynamic pressure surfaces of the bearing sleeve 41 and counter plate 43 side opposed thereto in close proximity are oppositely arranged in the axial direction through each small gap of several $\mu m$, and a lubricating fluid such as a lubricating oil, a magnetic fluid or air is continuously injected or interposed in the bearing space consisting of the small gaps through the outer peripheral side path of the thrust plate 33. In rotation, the lubricating fluid is pressurized by the pumping effect of the thrust dynamic pressure generating grooves provided to the thrust plate 33, and the dynamic pressure is generated. The bearing sleeve 41 and the rotary hub 42 are axially supported in a non-contact manner while being lifted in the thrust direction by the dynamic pressure of the lubricating fluid.

At this moment, a through hole 31a is formed so as to be parallel to the axial direction of the rotary shaft 31, and the illustrated upper and lower both ends of the rotary shaft 31 in the axial direction are caused to communicate with each other by the through hole 31a. A female screw portion 31b is formed at the inner wall portion forming the cylindrical shape of the through hole 31a, and a plate fixing screw 34 as a headed screw used to fix the thrust plate 33 is screwed to the upper end side of the female screw portion 31b. This plate fixing screw 34 has a male screw portion 34a which meshes with the female screw portion 31b on the fixed shaft 31 side. Further, the male screw portion 34a has a male screw portion 34a which engages with the screw head portion 31b. Moreover, the male screw portion 34a protrudes from the screw head portion 34b in the axial direction. Additionally, the male screw portion 34a of the plate fixing screw 34 is inserted into the through hole 31a of the fixed shaft 31 and screwed to the female screw portion 31b. As a result, the screw head portion 34b has the thrust plate 33 sandwiched in the axial direction. In this state, the plate fixing screw 34 is fastened, thereby fixing the thrust plate 33.

Additionally, an adhesive 36 having the oil resistance such as an epoxy resin is filled in a part extending from the substantially entire length of the screwing portion of the male screw portion 34a of the plate fixing screw 34 and the female screw portion 31b on the fixed shaft 31 side to the end of the male screw portion 34a of the plate fixing screw 34. This adhesive 36 is filled in such a manner that it enters the gap in the screwing portion of the plate fixing screw 34 and seals the through hole 31a in the axial direction, and the adhesive 36 completely prevents the lubricating fluid from leaking to the outside and avoids looseness of the plate fixing screw 34.

In the fixed shaft type dynamic pressure bearing apparatus having such a structure, it is possible to obtain substantially the same effects/advantages as those in each of the foregoing embodiments.

It is to be noted that the foregoing embodiments are just preferred embodiments according to the present invention, but they are not restricted thereto, and various modifications can be carried out without departing from the scope of the present invention. For example, the present invention is not restricted to the axial rotation type dynamic pressure bearing apparatus like the foregoing embodiments, and it can be likewise applied to the fixed shaft type dynamic pressure bearing apparatus. Additionally, the present invention can be likewise applied to the dynamic pressure bearing apparatus used in various apparatuses such as a polygon mirror drive motor or a CD-ROM drive motor other than the HDD motors such as described in the foregoing embodiments.

The invention claimed is:

1. A dynamic pressure bearing apparatus having a radial dynamic pressure bearing portion between an inner peripheral surface of a bearing and an outer peripheral surface of a shaft, and a thrust dynamic pressure bearing portion between a thrust plate attached on at least one end surface side of the shaft and the bearing or a counter plate fixed to the bearing, and generating a dynamic pressure to a lubricating fluid injected into each of the dynamic pressure bearing portions by relative rotation generated between the bearing and the shaft, thereby supporting the bearing and the shaft, the dynamic pressure bearing apparatus comprising: a bottomed screw hole being provided to at least one end of the shaft for screwing a headed screw therein to attach the thrust plate; the lubricating fluid being filled in a gap of a screw portion between the screw and the screw hole and a screw non-occupied space between a bottom portion of the bottomed screw hole and the screw portion end of the headed screw; and an interposing member being attached to the screw non-occupied space for reducing a void cubic volume in the screw non-occupied space; the interposing member being formed as a member integral with the headed screw.

* * * * *